US010262005B2

(12) United States Patent
Zhuang

(10) Patent No.: US 10,262,005 B2
(45) Date of Patent: Apr. 16, 2019

(54) METHOD, SERVER AND SYSTEM FOR MANAGING CONTENT IN CONTENT DELIVERY NETWORK

(71) Applicant: TENCENT TECHNOLOGY (SHENZHEN) COMPANY LIMITED, Shenzhen, Guangdong Province (CN)

(72) Inventor: Qi Dong Zhuang, Guangdong (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 781 days.

(21) Appl. No.: 14/691,456

(22) Filed: Apr. 20, 2015

(65) Prior Publication Data
US 2015/0242397 A1 Aug. 27, 2015

Related U.S. Application Data

(63) Continuation of application No. PCT/CN2014/078497, filed on May 27, 2014.

(30) Foreign Application Priority Data

Jun. 19, 2013 (CN) .......................... 2013 1 02446351

(51) Int. Cl.
*G06F 17/30* (2006.01)
*H04L 29/08* (2006.01)
*H04L 29/14* (2006.01)

(52) U.S. Cl.
CPC ...... *G06F 17/302* (2013.01); *G06F 17/30117* (2013.01); *H04L 67/1097* (2013.01); *H04L 69/40* (2013.01)

(58) Field of Classification Search
CPC .......................... G06F 17/302; G06F 17/30117
(Continued)

(56) References Cited

U.S. PATENT DOCUMENTS 8,341,130 B2 12/2012 Kaplan et al.
2002/0078174 A1* 6/2002 Sim .................. G06F 17/30194
709/219
(Continued)

FOREIGN PATENT DOCUMENTS

CN 1932821 A 3/2007
CN 101446984 A 6/2009
(Continued)

OTHER PUBLICATIONS

The State Intellectual Property Office of the People's Republic of China (SIPO) Office Action 1 for 201310244635.1 dated Oct. 9, 2017 11 Pages (including translation).
(Continued)

*Primary Examiner* — Mohammad S Rostami
*Assistant Examiner* — Saba Ahmed
(74) *Attorney, Agent, or Firm* — Anova Law Group, PLLC

(57) ABSTRACT

In one embodiment, a method for managing content in a content distribution network (CDN) is provided. The CDN includes a main controlling server, an edge node connected to the main controlling server, and an indexing system connected to the main controlling server. The method includes executing the following steps at the main controlling server: monitoring whether used storage space of the edge node exceeds a predetermined threshold value; acquiring a list of protected files (U1) from the indexing system if the used storage space exceeds the predetermined threshold value; performing directory traversal for the edge node to get a list of object files (U0) whose difference between latest
(Continued)

modified time and the current time exceeds a predetermined time range; getting a list of files to be deleted U2=U0−U1; and deleting each of the file included in U2 from the edge node.

20 Claims, 30 Drawing Sheets

(58) Field of Classification Search
 USPC .......................................................... 707/827
 See application file for complete search history.

(56) References Cited

U.S. PATENT DOCUMENTS

| | | | |
|---|---|---|---|
| 2002/0131423 | A1* | 9/2002 | Chan ................. G06F 17/30067 370/400 |
| 2008/0172387 | A1 | 7/2008 | Manczak et al. |
| 2008/0256138 | A1* | 10/2008 | Sim-Tang ........... G06F 11/1435 |
| 2010/0027512 | A1 | 2/2010 | Kishiyama et al. |
| 2012/0284290 | A1* | 11/2012 | Keebler .............. G06F 17/3089 707/756 |
| 2013/0268490 | A1* | 10/2013 | Keebler ............ G06F 17/30575 707/627 |

FOREIGN PATENT DOCUMENTS

| | | |
|---|---|---|
| CN | 101526948 A | 9/2009 |
| CN | 101561783 A | 10/2009 |
| CN | 101706814 A | 5/2010 |
| CN | 102195986 A | 9/2011 |
| CN | 102395047 A | 3/2012 |
| CN | 102438020 A | 5/2012 |
| CN | 103095688 A | 5/2013 |
| EP | 2466498 A2 | 6/2012 |

OTHER PUBLICATIONS

Michael A. Olson, The Design and Implementation of the Inversion[R]. Tech. rep., Berkeley, CA, USA, 1993 pp. 1-13.

Wang Lei et al., Some energy-saving tips for file systems in Linux systems, URL: http://www.ibm.com/developerworks/cn/linux/l-cn-fsgreen/index.html, released on Mar. 9, 2010 11 Pages (including translation).

David Karger et al., Consistent hashing and random trees: distributed caching protocols for relieving hot spots on the World Wide Web[C]. Proceedings of the twenty-ninth annual ACM symposium on Theory of computing. STOC '97, New York, NY, USA: ACM, 1997, pp. 654-663.

Giuseppe Decandia et al., Dynamo: amazon's highly available key-value store, Proceedings of twenty-first ACM SIGOPS symposium on Operating systems principles. SOSP '07, New York, NY, USA: ACM, 2007, pp. 205-220.

Jharrod Lafon et al., On distributed file tree walk of parallel file systems, Proceedings of the International Conference on High Performance Computing, Networking, Storage and Analysis. SC '12, Los Alamitos, CA, USA: IEEE Computer Society Press, 2012, pp. 1-11.

Carl Henrik Lunde et al., Improving file tree traversal performance by scheduling I/O operations in user space, IPCCC. IEEE, 2009, pp. 1-8.

Fengguang Wu, Prefetching algorithms in the Linux kernel, Ph.D. thesis, University of Science and Technology of China, Hefei, 2008 pp. 1-138.

Yao Shi et al., THSORT: Standalone Parallel Sorting Algorithm, Journal of Software, 2003,2(14), pp. 159-165.

* cited by examiner

| inode number | offset | len | type | filename |

FIG. 11

METHOD, SERVER AND SYSTEM FOR MANAGING CONTENT IN CONTENT DELIVERY NETWORK

PRIORITY

This application is a U.S. continuation application under 35 U.S.C. § 111(a) claiming priority under 35 U.S.C. § 120 and 365(c) to International Application No. PCT/CN2014/078497 filed May 27, 2014, which claims priority to a CN patent application serial No. 201310244635.1, titled "method, apparatus and system for distributing content in content delivery network" and filed on Jun. 19, 2013, the contents of which are incorporated by reference herein in their entirety for all intended purposes.

TECHNICAL FIELD

The present invention relates to content delivery network, and more particularly to a method, a server and a system for managing content in a content delivery network.

BACKGROUND

Content delivery network is a network architecture build on the existing internet. Hot web resources, such as web pages, images, music and videos, that are frequently required by the users are distributed to edges nodes closest to the users. In this way, the users could download the web resources quickly. Thus, network congestion is reduced, and the response rate of web sites is also improved.

However, the web resources are growing rapidly, and the storage space of the CDN is limited. Therefore, the files stored in the CDN should be cleaned periodically. As the number of files is huge, a lot of time is consumed to clean the files. It is desirable to provide an efficient way to clean the files.

SUMMARY

In view of above problems, there is a desire to provide a method capable of solving the problem.

A method for managing content in a content distribution network (CDN) is provided. The CDN includes a main controlling server, an edge node connected to the main controlling server, and an indexing system connected to the main controlling server. The method includes executing the following steps at the main controlling server: monitoring whether used storage space of the edge node exceeds a predetermined threshold value; acquiring a list of protected files (U1) from the indexing system if the used storage space exceeds the predetermined threshold value; performing directory traversal for the edge node to get a list of object files (U0) whose difference between latest modified time and the current time exceeds a predetermined time range; getting a list of files to be deleted U2=U0−U1; and deleting each of the file included in U2 from the edge node.

A system for managing content in a content delivery network is provided. The system includes: a main controlling server and an indexing server;

The main controlling server is configured for monitoring whether used storage space of the edge node exceeds a predetermined threshold value; acquiring a list of protected files (U1) from the indexing system if the used storage space exceeds the predetermined threshold value; performing directory traversal for the edge node to get a list of object files (U0) whose difference between latest modified time and the current time exceeds a predetermined time range; getting a list of files to be deleted U2=U0−U1; and deleting each of the file included in U2 from the edge node;

The indexing server is configured for returning the list of files to be protected U1 according to a request from the main controlling server.

A main controlling server in an edge node of a content delivery network is provided. The server includes memory; one or more processors; and one or more modules stored in the memory and configured for execution by the one or more processors.

The one or more modules comprising instructions: to monitor whether used storage space of the edge node exceeds a predetermined threshold value; to acquire a list of protected files (U1) from the indexing system if the used storage space exceeds the predetermined threshold value; to perform directory traversal for the edge node to get a list of object files (U0) whose difference between latest modified time and the current time exceeds a predetermined time range; to get a list of files to be deleted U2=U0−U1; and to delete each of the file included in U2 from the edge node.

The method provided by the present embodiment has the following advantages.

1. It is not necessary to maintain a global index of all resources in edge nodes, and it is also not necessary to sort the resources according to access frequency. Thus, the function of edge nodes in a CDN is simplified in the greatest extent, hardware consumption of edge nodes is reduced, and the performance of edges is improved.

2. It is not necessary to open the atime property in the web server and the storage server of edge nodes in a CDN. Accordingly, read operation of file doesn't cause a write operation to a physical data block. Unnecessary disk write operations are avoided, service performance is improved, and the energy consumption is reduced.

The above description is only an overview of the technical solutions of the present invention. In order to understand the technical solutions of the present invention more clearly, implement the technical solutions of the present invention according to the following specification, and make the purpose, the characteristics, and the advantages of the present invention more easily to understand, hereinafter, combined with accompanying drawings, embodiments of the present invention are described as follows.

BRIEF DESCRIPTION OF THE DRAWINGS

Figure 11:
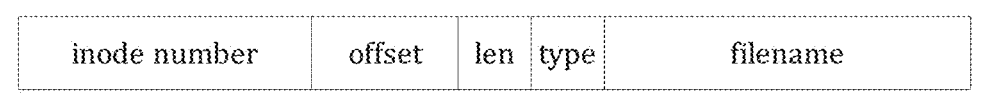

FIG. 11 is a schematic view of a directory entry.

DETAILED DESCRIPTION OF PREFERRED EMBODIMENTS

The present invention will now be described more specifically with reference to the following embodiments. Hereinafter, combined with the accompanying drawings of the embodiments of the present invention, the purpose, technical solutions and advantages of the embodiments of the present invention are clearly and fully described as follows.

Figure 1:
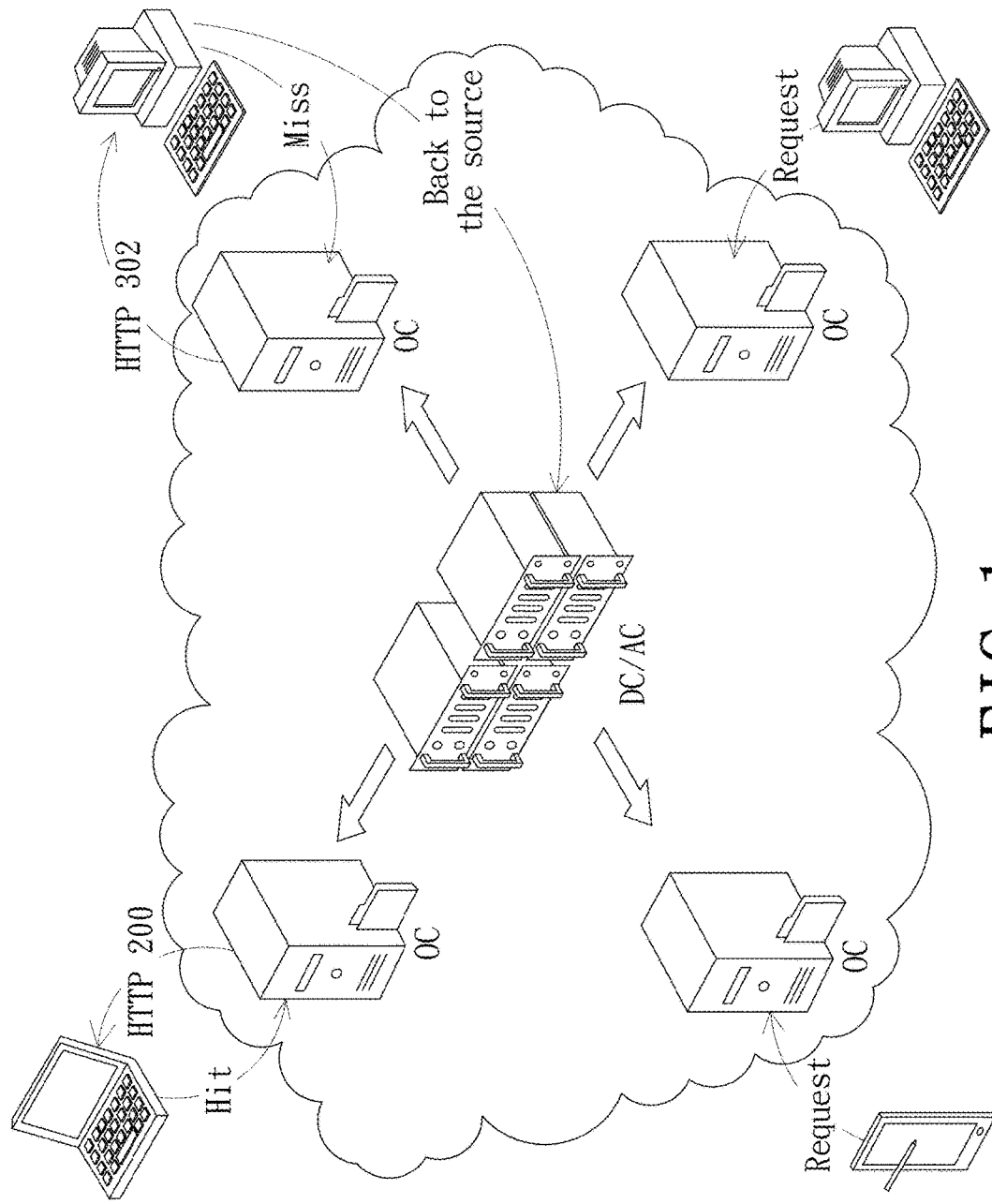
FIG. 1 is a schematic view illustrating architecture of a typical CDN.

FIG. 1 is a schematic view illustrating architecture of a typical CDN, wherein DC represents a data center, AC represents an area center (also a regional center), and OC represents an outside center (also called an edge node). If a web request from a client hit a resource stored in an OC that having a closest network topology distance to the client, the OC return the resource directly. Otherwise, a web server in the OC returns a HTTP 302 response to the client for redirecting the client to the DC or AC. This process is called "back to the source".

In a CDN system, an important method of improving the quality of service (QoS) is to reduce the chance of back to the source as far as possible. However, if all the resources are continuously delivered to the edge nodes, as the storage space is limited, the storage device is necessarily exhausted after a certain time, and the quality of service deteriorates significantly. In addition, some hot data will become cold data and it isn't necessary to store them in the edge nodes any more. Thus, the used storage space of the edge nodes should be kept below a certain threshold value, or a file deleting process should be executed after the used storage space exceeds a certain threshold value. Besides, except the periodical file deleting process, a temporary file deleting process is also required to release more storage space under some conditions, for example, when there is a new application is deployed.

To perform the temporary file deleting process, an easiest way is to sort all the files stored in the OC (edge nodes of the CDN) by the order of the last accessed time, or maintain a LRU (least recently used) linked list, which records times of recently used for all the files. Then, one or more files that have earliest last accessed time or at and end of the LRU linked list could be deleted.

However, a lot of memory space would be occupied to store the last accessed time or the LRU linked list for all the files in an OC. In addition, every time a user request is received, the global data structure should be adjusted for the first method, and a time complexity of the adjustment process is logarithmic time (O(log n)). For the second method, a time complexity thereof is constant time (O(1)). However, if the system crashes or the system need to be restarted for special purpose, additional time is required to rebuild the LRU linked list (a process having an O(1) time complexity), and the new LRU linked list only include temporary information that can't reflect the real accessing details. Thus, the file deleting process should be delayed.

To avoid the memory and computing cost of the above methods, a rough alternative implementation is to use the file system atime property, which is the timestamp of the last accessed time. If the atime property is activated in the file system, all the files can be traversed and the files having a last accessed time earlier to a certain time can be deleted in the traversing process. This method is similar to the LRU method. However, the cost of updating the "atime" property for each file access in the file system is also huge. It is to be noted that the aforementioned file access is not means opening a file in an application, but means an open or read operation performed by the core of the file system.

To update the "atime" property, every reading operation causes a writing operation to the disk, even if the read content is already exists in the page cache. The writing operations lead to frequent busy state of the disks, the system performance deteriorates (as the writing operations can only be performed in a single thread, one writing operation would block all the other writing operations), and more electrical power are consumed. Thus, in practical online web systems, the "atime" property is usually closed. In the system core of Linux 2.6.20 and 2.6.24, a delayed updating policy is applied to the "atime" property. However, this policy only has little effect in the web systems that stores massive files and provide services for massive concurrent users.

Power-Law Distribution

September 1999, Barabasi group published a news report on "Nature" (Albert, R., Jeong, H. and Barabási, A L. "Diameter of the World-Wide Web." Nature (London) 401, no. 6749 (1999): 130). This article points out that in/out-degree distribution of the internet and the normal distribution are very different, and the in/out-degree distribution of the internet meets power-law distribution. More importantly, the paper reveals the mechanism of two power-law distribution generated. Unlike ER random graphs (Erdős-Rényi random graph), the actual network has two important features: the first is growth characteristics, the size of the network is expanding; the second is preferential attachment characteristics, that is new nodes tend to be connected to those nodes that have a high degree of connectivity, this phenomenon is also called "the rich get richer" or "Matthew effect". A month later, Barabasi group also published an article in "Science" (Albert-László Barabási & Réka Albert (October 1999) "Emergence of scaling in random networks" Science 286 (5439): . . . 509-512). Thus article pointed out, degree distribution of many real networks, including networks of movie actors and electricity networks, are also meet the power-law distribution, which is subject to be very different with Poisson distribution.

By empirical studying, Bing-Hong Wang et al. from Chinese University of Science and Technology summed up: "Through a variety of different methods of data collection, they researched human behaviors in internet, including market transactions, web browsing, movie watching, music listening, mobile communications, in games and virtual communities behaviors, the use of computer instructions, commercial activities, entertainment acts, and many other daily habits of human behavior, and these behaviors have a better power-law distribution" (see Tao, Zhou, Wei-Ke, Xiao, Jie Ren, Bing-Hong Wang, the power-law distribution of the internet, Complex Systems and Complexity Science, 2007 02; Chao, Fan, Jin-li, Guo, Xiao-Pu, Han, Bing-Hong, Wang, A Review of Research on Human Dynamics, Complex Systems and Complexity Science, 2011 02).

Figure 2:
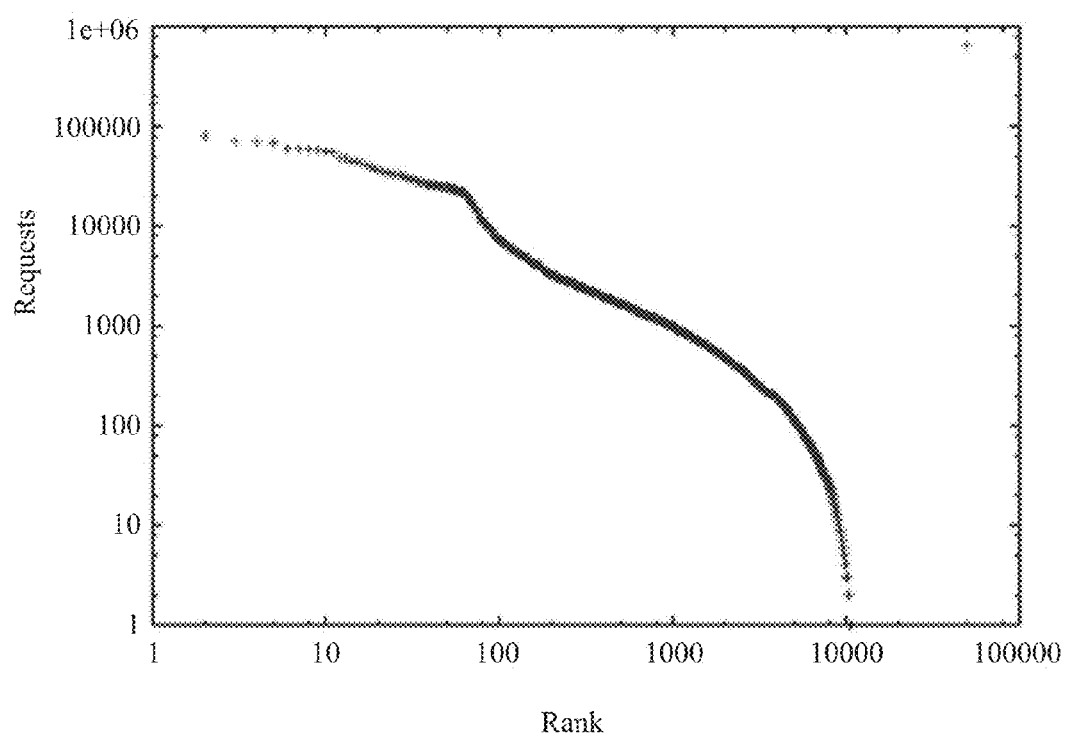
FIG. 2 is a schematic view of user access statistics of a video website.

Now with a video web site, accessing to media files of a subsystem of the view web site that stored in servers located in one city is recorded, and the statistics is shown in FIG. 2. Further calculations show that the Pearson correlation coefficient of the number of requests to access the media files and their ranking in the double logarithmic coordinates is 0.93, the distribution approximately obey Zipf distribution.

Figure 3:
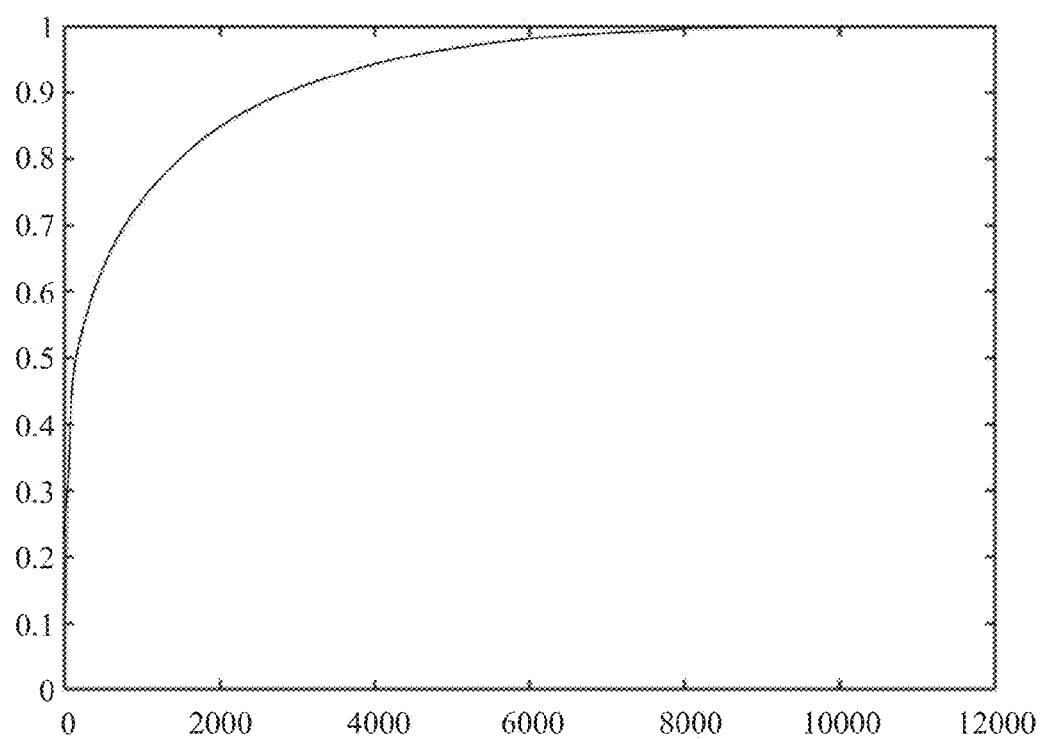
FIG. 3 shows the cumulative distribution function of the user access requests.

FIG. 3 shows the cumulative distribution function of the access requests, it can be seen that access frequency rank in the top 20% of media files contributed more than 86% of visits; apparently, this distribution is in line with the Pareto principle.

Further statistics are performed to get daily visit count of all the media resources in the video website. The statistical result shows that more than 56% of the media resources have been accessed in the past 30 days, but the daily visit count thereof is no more than 1, and daily visit count of over 77% media resources is no more than 3. Thus, the daily visit count of most media resources shows significant long-tail distribution, and most of the media resources belong to unpopular resources.

Exponential Decay

Figure 4:
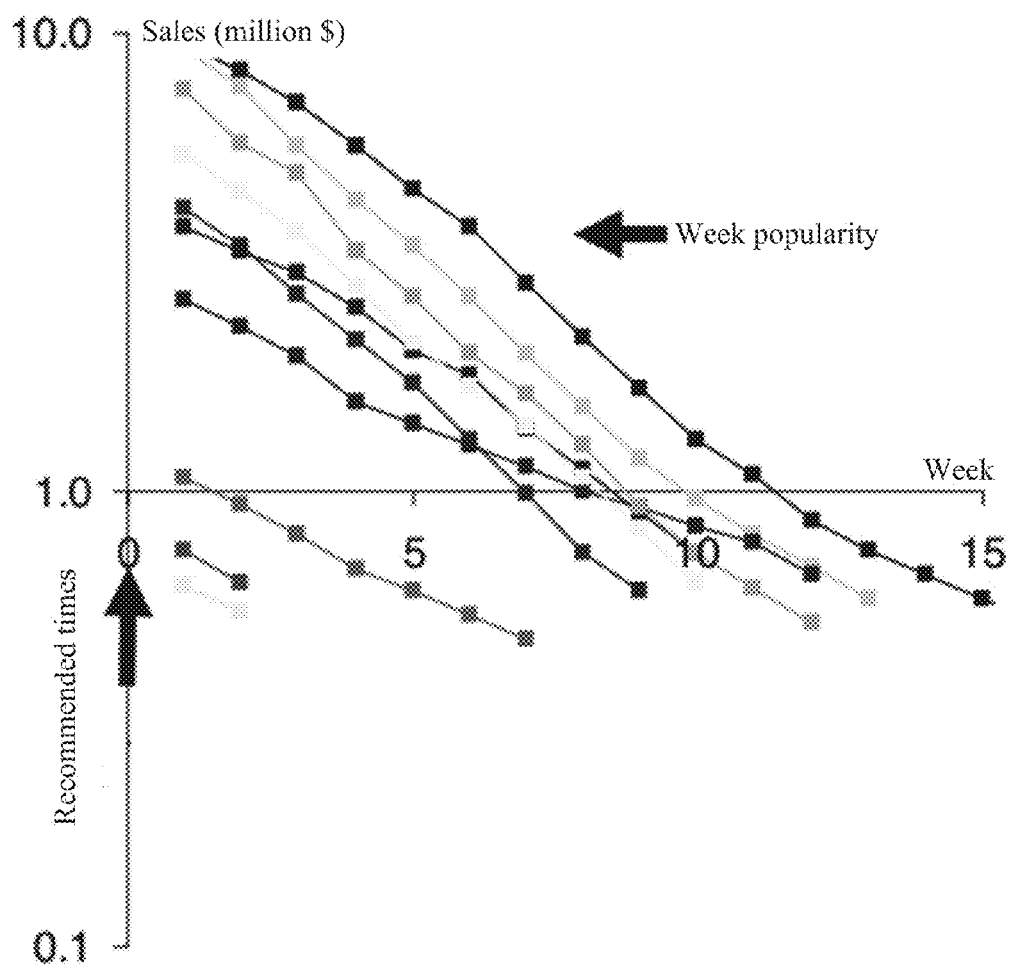
FIG. 4 shows a correlation of the box office and the showtimes for several movies.

FIG. 4 shows a correlation of the box office and the showtimes for several movies in the internet movie database (IMDB). As shown in FIG. 4, the correlation shows significant exponential decay. Similarly, access to resources in a content service platform, such as a video website, also shows a similar situation. Access to a media file usually reaches a maximum value within 1-3 days of the introduction, and then access rate shows approximate exponential decay.

Although decay parameters of different type of media resources are different, and even some special media resources will have several peaks, but a common feature is that once a media resources become an unpopular resource, the media resources has little chance to be popular again. Transferring of popularity of media files are artificially categorized and further statistics show that: if one media file has been accessed on day i−3, and has no access on day i−2 and day i−1, the probability of the media file has no access on day i is greater than 0.75, if the file has no access in the past 5 days and the probability of the media file has access on the next day is less than 0.01.

Figure 5:
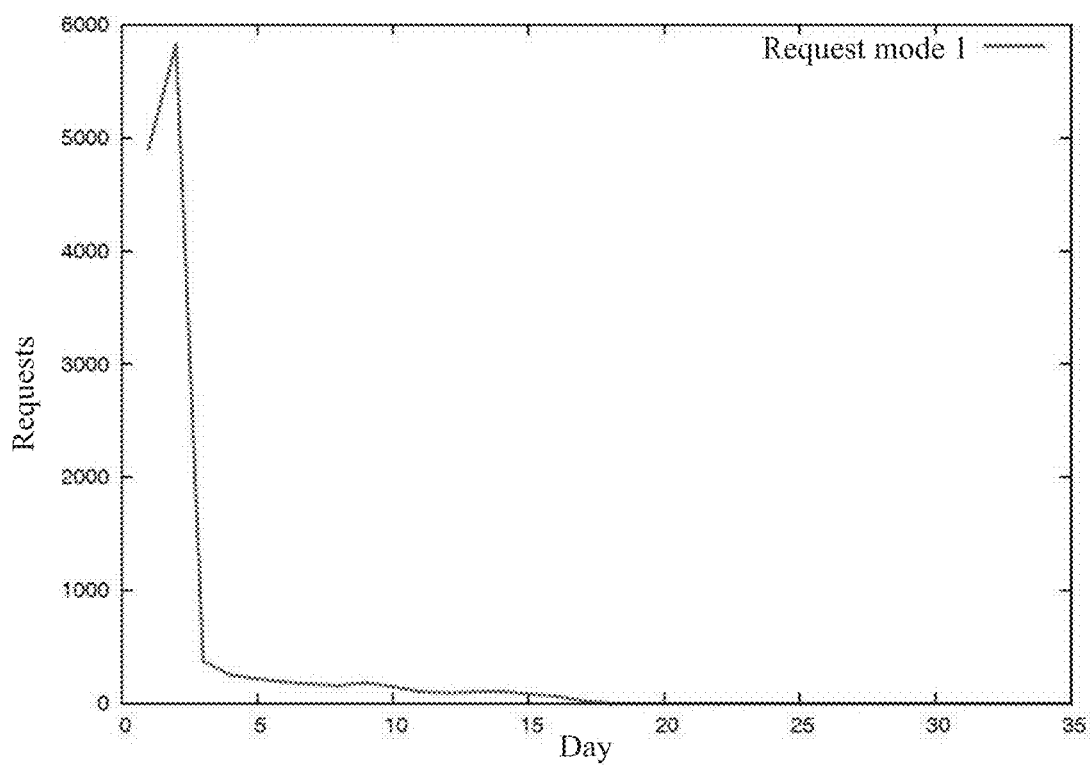
FIGS. 5, 6, 7 show three different modes of user access to resources.
Figure 6:
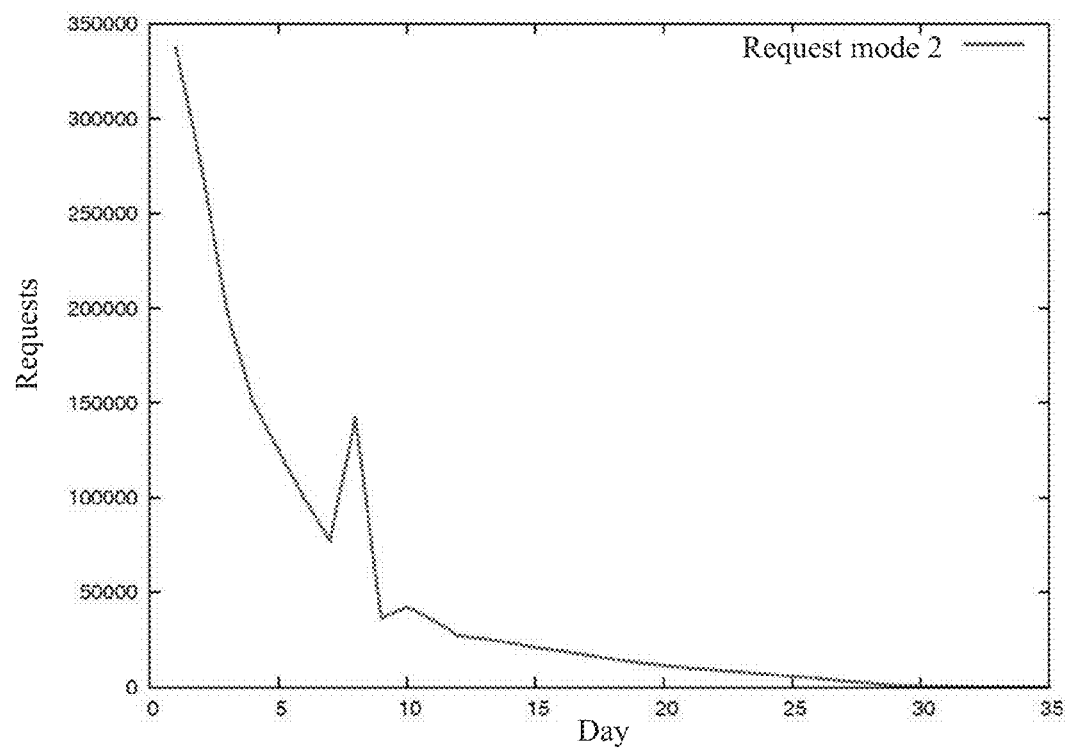
Figure 7:
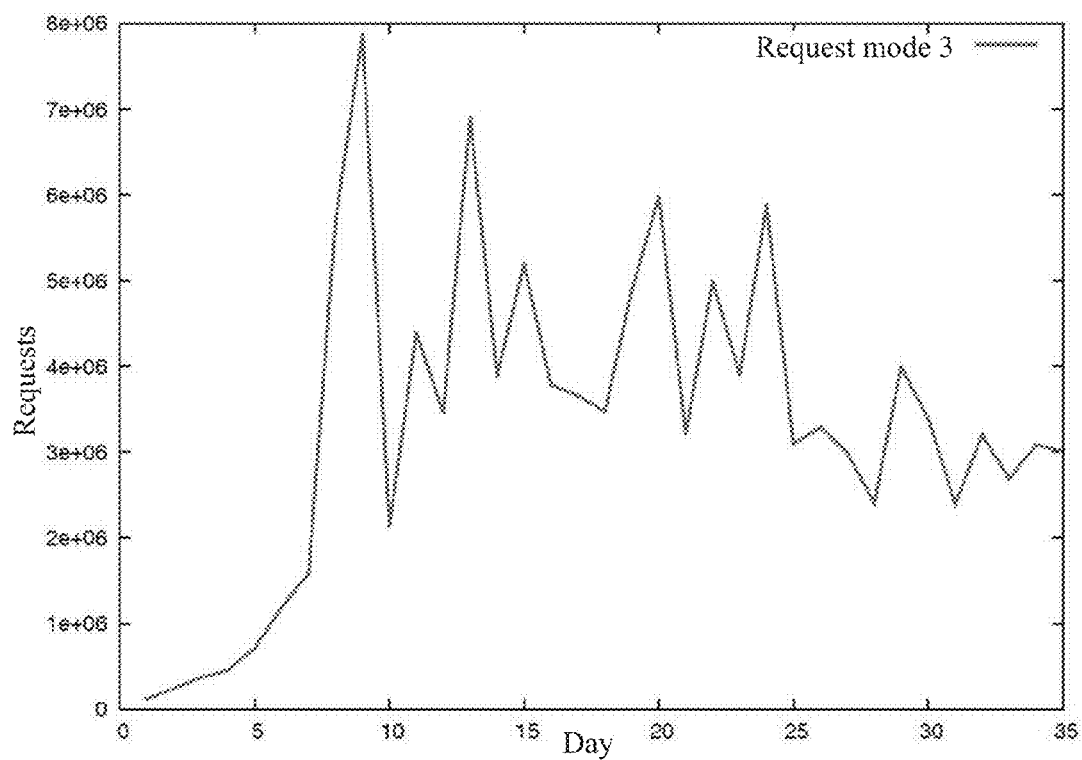

FIGS. 5, 6, 7 show three different modes of access to resources. Most of the news video and the vast majority of user-generated video meet the mode of FIG. 5, in which access to a media file usually reaches a peak value within 1-3 days of the introduction, then plummets to a small value, finally the access to the media file decay exponentially to zero. Part of the news video and most unpopular television video meet the mode of FIG. 6, the overall access gradual decline exponentially, but for some reasons there are several small peaks formed. A small part of the extreme popular resources (either resources uploaded by the editor or UGC resources) meets the mode of FIG. 7, the amplitude of the curve is big, but the frequency of access is always maintained at a high value.

But in both cases, when access frequency of a resource is reduced to a small enough value, then subsequently access almost certainly meet exponential decay; once a resource has a visit frequency of 0 for several days, then the probability of access in the subsequent one day is very small.

The above statistics also applies to other type of resources such as, pictures, or other static resources, but the decay parameters vary.

Figure 8:
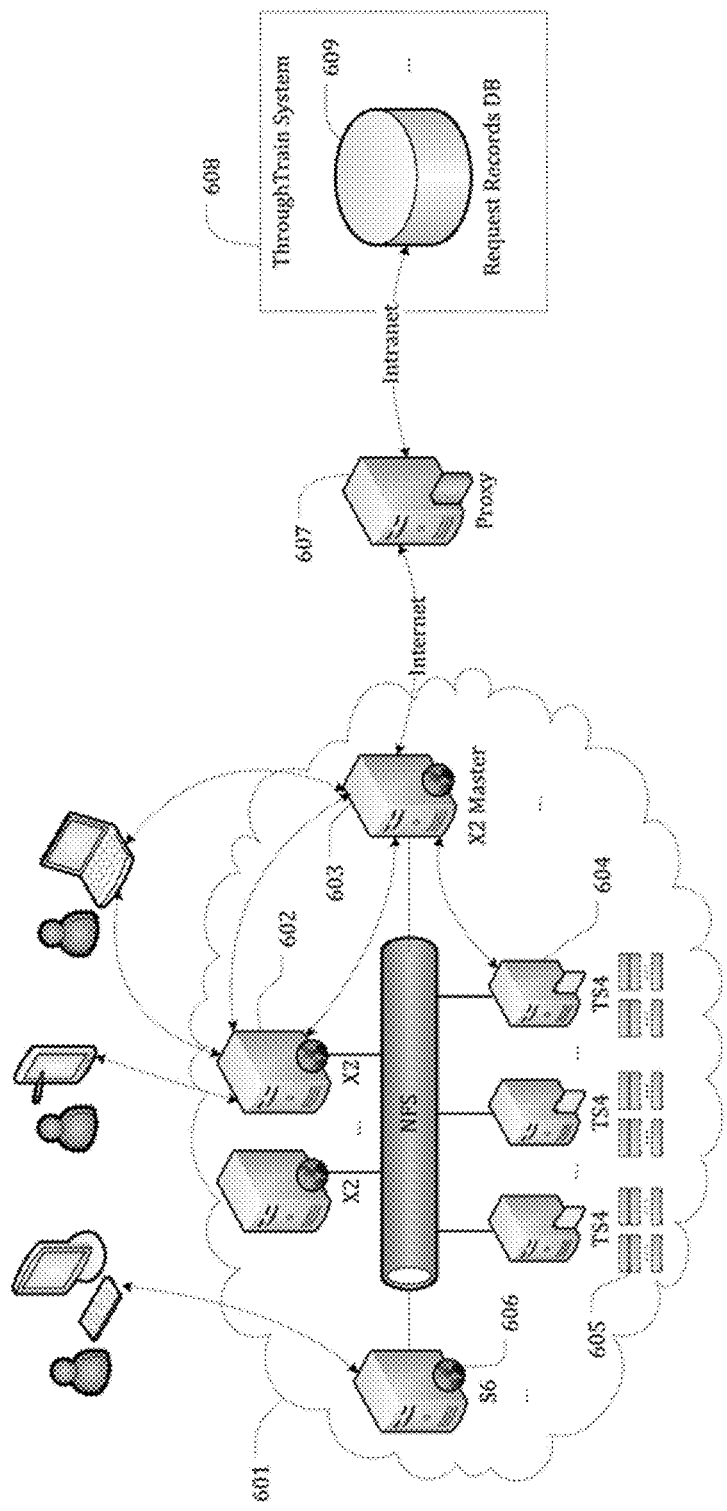
FIG. 8 is a schematic view of a system for managing content in a CDN.

FIG. 8 is a schematic view of a system for managing content in a CDN. As shown in FIG. 8, the system includes an edge node 601 of a CDN, a proxy server 607 and an indexing system 608. The edge node 601 includes a web server 602, a main controlling server 603, a storage server 604 and a cache server 606.

The web server 602, the main controlling server 603, the storage server 604 and the cache server 606 may have similar hardware architecture. For example, they may include one or more processors, and memory for storing one or more software components or modules. The one or more processors are configured for executing the one or more software components or modules stored in the memory.

Memory includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory may optionally include one or more storage devices remotely located from the CPU(s). Memory, or alternately the non-volatile memory device(s) within memory, comprises a non-transitory computer readable storage medium.

The web server 602 is configured for providing web services for users accessing the edge node 601, receiving user requests and return corresponding resources. In one embodiment, the web server 602 has the following hardware configurations: one 4-core processor, 8 G memory, 1*1 T SATA hard disk. The main controlling server 603 has similar hardware configuration to the web server 602, and also have similar functions. That is, the main controlling server 603 can also serve as a web server. In addition, the main controlling server 603 is further configured for performing a method for managing content in the edge node 601, as described in the following embodiments.

The storage server 604 is configured for storing data for the edge node 601, and each storage server 604 is connected to multiple storage devices 605, such as hard disks. In one embodiment, the storage server 604 has the following hardware configurations: 2 4-core processors, 16 G memory, a host bus adapter, and 12*1 T SATA hard disks.

The cache server 606 is configured for storing data for hot resources. In one embodiment, the cache server 606 has the following hardware configurations: 2 4-core processors, 36 G memory, 4*500 GB SATA hard disks, 2*512 G or 8*160 G solid state disks.

The web server 602 and the main controlling server 603 can manage files stored in the storage server 604 and the cache server 606 using a network file system.

The edge node 601 is connected to the proxy server 607 via the internet; the proxy server 607 is connected to the indexing system 608 via an intranet. The proxy server 607 can be implemented with the following technologies: a two-way TCP proxy, CGI (Common Gateway Interface)

proxy over HTTP, or proxy based on ASN.1 (Abstract Syntax Notation One) protocol framework.

To ensure safety, communications between the proxy server 607 and the edge node 601 or the indexing system 608 uses an encrypted manner. For example, if the TCP proxy or the HTTP proxy is used, the transmitted data must carry a verifying code to prevent attacking (e.g., injecting). In one embodiment, the verifying code can be generated by a data block based symmetric encryption algorithm (e.g., extended tiny encryption algorithm, XTEA) or a flow-based symmetric encryption algorithm (e.g., chacha). If the ASN. 1 proxy is used, because the ASN.1 itself is a protocol framework capable of achieving flexible encoding/decoding, and thus the additional verifying code is not necessary. The indexing system 608 includes a request recording database 609, which is configured for storing file access records of all the files, user generated files and files to be protected permanently in the edge node 601. In one embodiment, the request recording database 609 includes the following sub-databases: DBhot, DBpub and DBperm.

The sub-database DBhot is configured for storing file access records, and at least includes the fields for storing the filename, channel, visit count. An individual data table can be used for file access records of every day. The global access statistics have slight delay and the access log files from all the edge nodes and the area centers should be emerged. At a time point (e.g., 4:00 am) when there are minimum file access, verification computation can be performed and the global statistics can be calculated again.

The sub-database DBpub is configured for storing files uploaded by the editor but not published yet. Similar to the sub-database DBhot, an individual data table can be used for every day.

The sub-database DBperm usually includes a data table whose data varies from one time to the other time, and is configured for storing the files to be protected from being deleted.

The data in the sub-database DBhot is summarized from data collected from a number of (e.g., dozens) edges nodes, several (e.g., about ten) area centers, and several data centers. Generally, web servers in the edge node can upload its file access log file to the indexing system 608 for every predetermined time period (e.g., 15 minutes). The indexing system 608 merges received file access log file, perform statistics to the merged log file and update the sub-database DBhot according to the statistics results every morning. Namely, the sub-database DBhot includes the file access statistics of all the files. However, it is to be noted that the data of the current day is lacked, or at least part of the data of the current day is lacked.

Saving Files in the CDN

If a file needs to be published to the CDN, copies of the file should be delivered to storage server in each edge node. Practically, the file delivery process can be done by a file delivery system. That is, each edge node includes a client (e.g., server running client software) of the file delivery system, and the client is configured for receiving pushed files from a source. After receiving the pushed file, the client should save the received file in a certain directory of a storage server.

In one embodiment, the client save the received file in the following directory: /DATAx/(CHANNEL/)y/z/filename.

In the above directory, "CHANNEL" is the channel name, "DATAx" is the root directory of a disk numbered "x", and "filename" is the filename of the received file. Every file belongs to a channel (or in other words, category). It is to be noted that the channel name is not necessary, or the channel has a multilevel directory structure (e.g., channel/sub-channel/sub-sub-channel).

x, y, and z should satisfy the following conditions:

$$\begin{cases} x = DiskID, & DiskID \le 256/N; \\ y = hash_1(filename) \bmod A, & 96 \le A \le 128; \\ z = hash_2(filename) \bmod B, & 96 \le B \le 128. \end{cases}$$

In the above formula, N represents the number of the storage servers in an edge node. Generally, the maximum number of disks can be mounted on a network file system is 256 and each storage server may include the same number of disks, thus the value of "DiskID" is not greater than 256/N. For example, in one embodiment, an edge node includes 20 storage servers, and each storage server is connected to 12 disks, the total number of the disks is 240.

Hash1 and hash2 are two hash functions whose results have uniform distribution. In one embodiment, hash1 and hash2 can be BKDR function, BObJenkins function or SuperHash function. In one embodiment, hash1 and hash2 are two different hash functions.

Ranges of y and z in the above formula is designed to improve the performance of directory traversal, and the mechanism of how to improve the performance by adjusting the value of y and z will be described in the following part of "directory traversal in network file system".

As shown in FIG. 8, each of the web servers 602 (or the main controlling server 603) can manage the files stored in the storage server using the network file system. By using the network file system, the web server 602 mount not more than 256 disks in the storage servers to a virtual directory k thereof. The virtual directory k has the following structure: /data/k/CHANNEL/y/z/filename In the above formula, k≤10000, and k, x are of uniform many to one mapping. Design of this many to one mapping can refer to consistent hashing techniques. (See David Karger, Eric Lehman, Tom Leighton, Rina Panigrahy, Matthew Levine, Daniel Lewin. Consistent hashing and random trees: distributed caching protocols for relieving hot spots on the World Wide Web[C]. Proceedings of the twenty-ninth annual ACM symposium on Theory of computing. STOC '97, New York, N.Y., USA: ACM, 1997, 654-663. http://doi.acm.org/10.1145/258533.258660, which are all incorporated here by reference in their entirety). The consistent hashing techniques can be further improved by introducing the concept of virtual nodes. (See Giuseppe DeCandia, Deniz Hastorun, Madan Jampani, Gunavardhan Kakulapati, Avinash Lakshman, Alex Pilchin, Swaminathan Sivasubramanian, Peter Vosshall, Werner Vogels. Dynamo: amazon's highly available key-value store[C]. Proceedings of twenty-first ACM SIGOPS symposium on Operating systems principles. SOSP'07, New York, N.Y., USA: ACM, 2007, 205-220. http://doi.acm.org/10.1145/1294261.1294281, which are all incorporated here by reference in their entirety).

According to the above designs, each of the file that the file delivery system distributes to the CDN is stored into a certain logic directory. In addition, the huge number of files and the uniform distribution provided by the hashing techniques ensure that a file directory tree generated is a balanced tree having limited height and available levels of two. This type of directory structure makes the parallel directory traversal based on data partition is possible, and load balancing between the different traversing threads can be achieved. In addition, the logic depth of the stack used to perform the directory traversal is controllable. Thus, the performance of the directory traversal is improved.

According to the above design, the storing process of the file in the storage server uses a two-level hashing uniform distribution. After mapped by the network file system, the file path is of a three-level hashing uniform distribution. However, the more levels of hashing can also be used.

Parallel Directory Traversal in Network File System

In computer systems, the continuously expanding performance gap between the CPU and input/output system (I/O) affects parallel programming. Improvement of data transfer bandwidth of disks can't keep up with growth in CPU computing power; and improvement on data access latency is seriously lagging behind. For this reason, Linux and other operating systems took prefetching techniques to improve disk I/O performance; these techniques can effectively change small synchronous I/O operations from the applications into a large asynchronous I/O operation, thereby reducing access latency, and facilitating I/O parallelism. However, for concurrent I/O operations to a single disk, the mutex in the operating system kernel will force the I/O operations are executed serially. In addition, although the Linux system will effectively identify and handle concurrent I/O requests in the order flow, but the file traversing of all the files on the disk easily causes cache invalidation. For example, Linux operating system kernel has a data structure "dcahe" used to cache previously resolved directory entry. The "dcache" uses LRU policy to manage, but if the initial LRU list is empty, then a traversing operation having a length of more than k+1 will make hit rate of the "dcache", which has a length of k, is zero.

Besides, the files to be deleted from the edge node are all rarely accessed files. On the other hand, statistical data also shows that most of the files in the edge node are rarely accessed files, but obviously, the directory entry included in the LRU list of the "dcache" belongs to hot files.

Thus, during the directory traversal process, the chance of the "dcache" doesn't hit is almost 100%.

Furthermore, concurrent I/O requests force the head arm of the disk addressing back and forth, and this exacerbate disk performance deterioration. The fact showed that many file systems, the traversal performance will be reduced with the increase of the number of threads when the number of threads is more than two.

Therefore, for file (or directory) traversing in a network file system, I/O operations in a single disk should be performed serially, while traversing of different disk should be performed in parallel.

Figure 9:
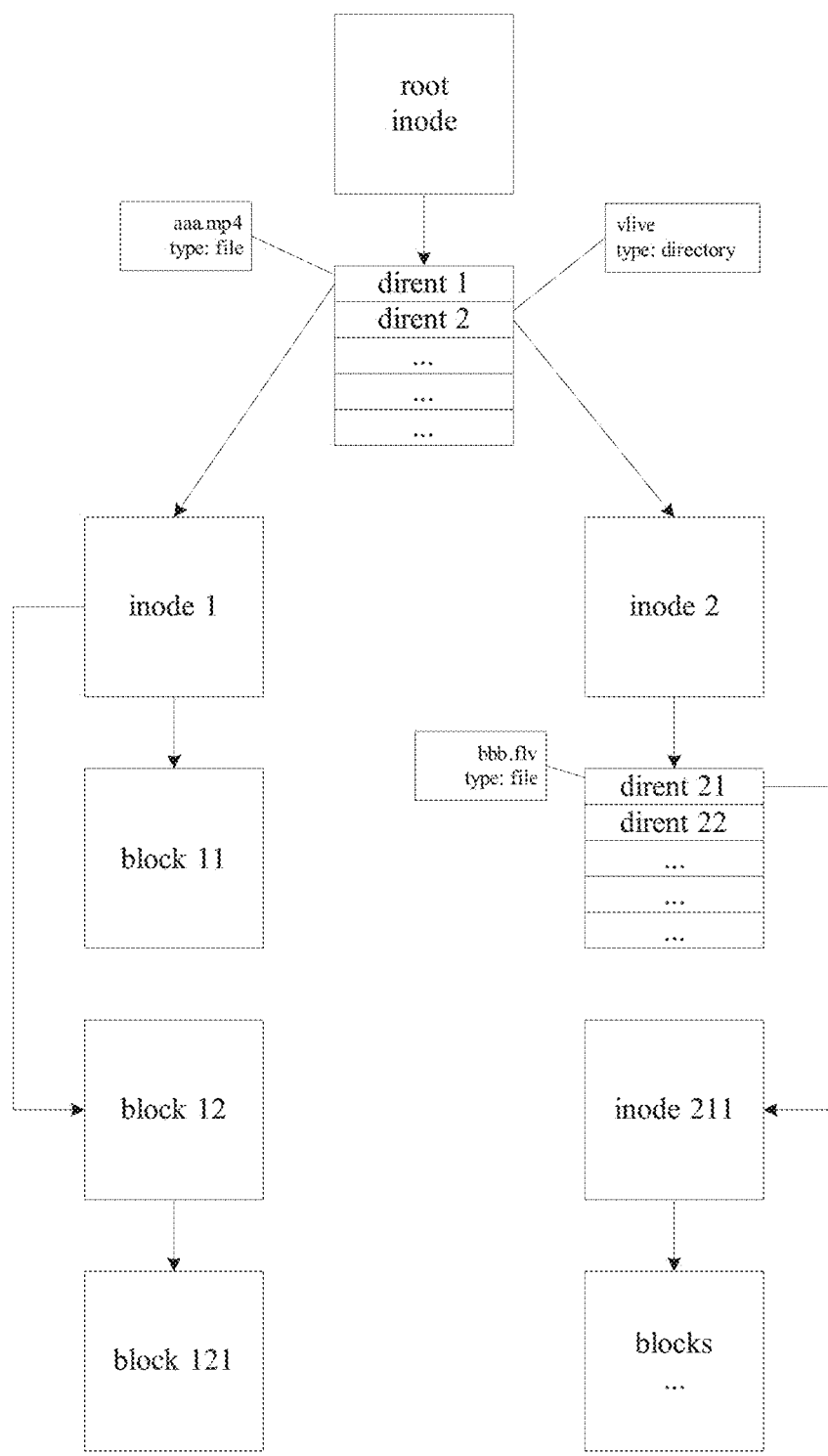
FIG. 9 is a schematic view illustrating a file tree in Unix/Linux file system.
Figure 10:
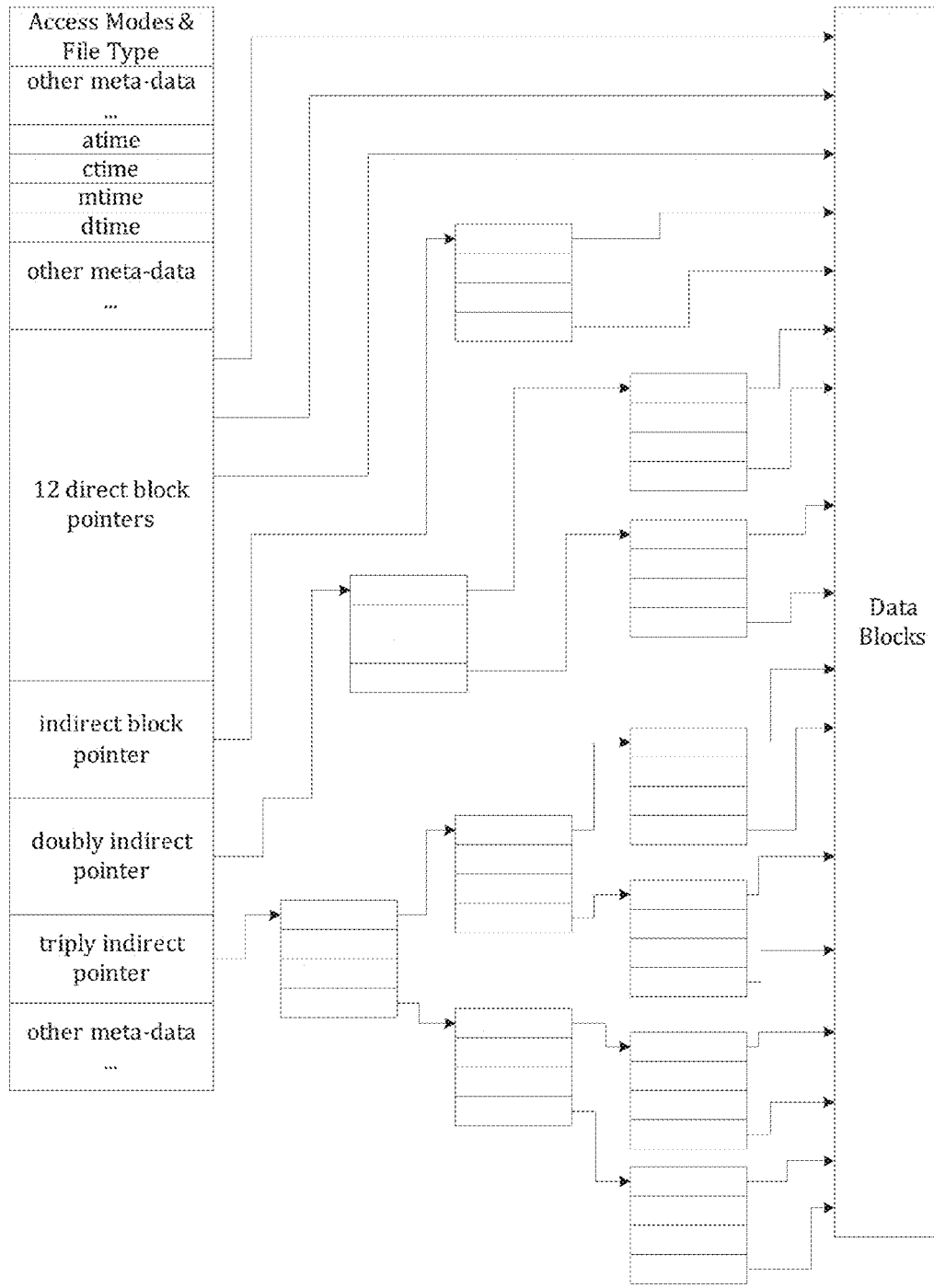
FIG. 10 is a schematic view of inode.

In a typical Unix/Linux file system, inode (also known as i-node), directory entries (dirent or directory entry), the data block (or block) constitute a large file tree, as shown in FIG. 9.

inode indicates all meta information except file name, such as mtime (last modification time) other items, and provides multi-level data block indexing, as shown in FIG. 10.

dirent indicates the file/directory names and inode correspondence. After Linux2.6.4, an additional byte is used to represents the domain of the file/directory, as shown in FIG. 11.

Data block is the basic unit of read/write operations of disk, and usually is 4K bytes. It is worth noting that an inode or a dirent, are necessarily in a data block.

Figure 12:
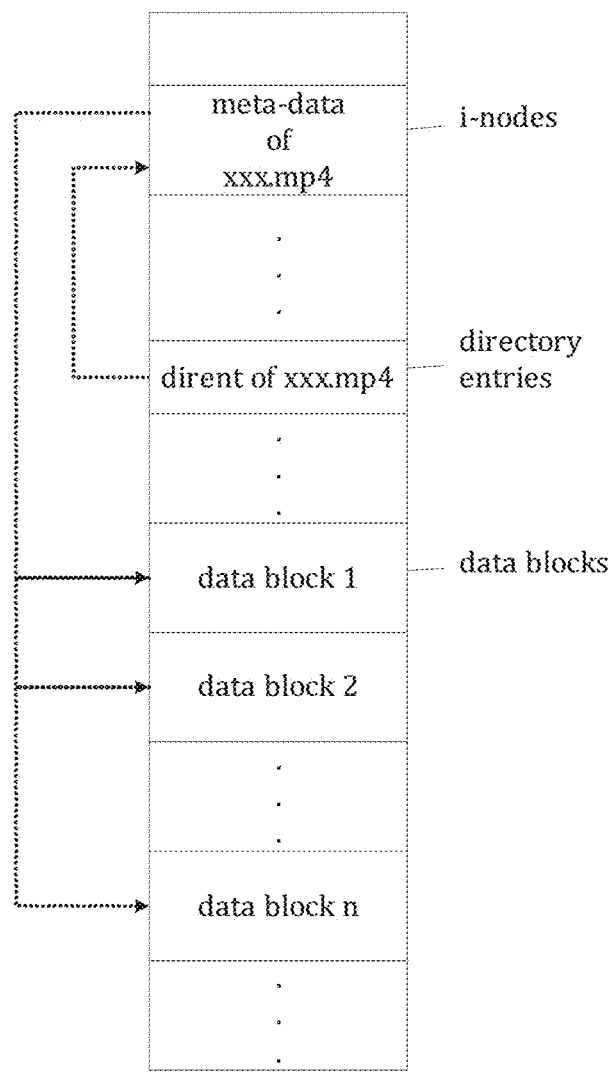
FIG. 12 is a schematic view showing inode, directory entry and data block of a file.

FIG. 12 shows the relation of inode, dirent, and data block of a file xxx.mp4 in a linear address area of a disk.

Figure 13:
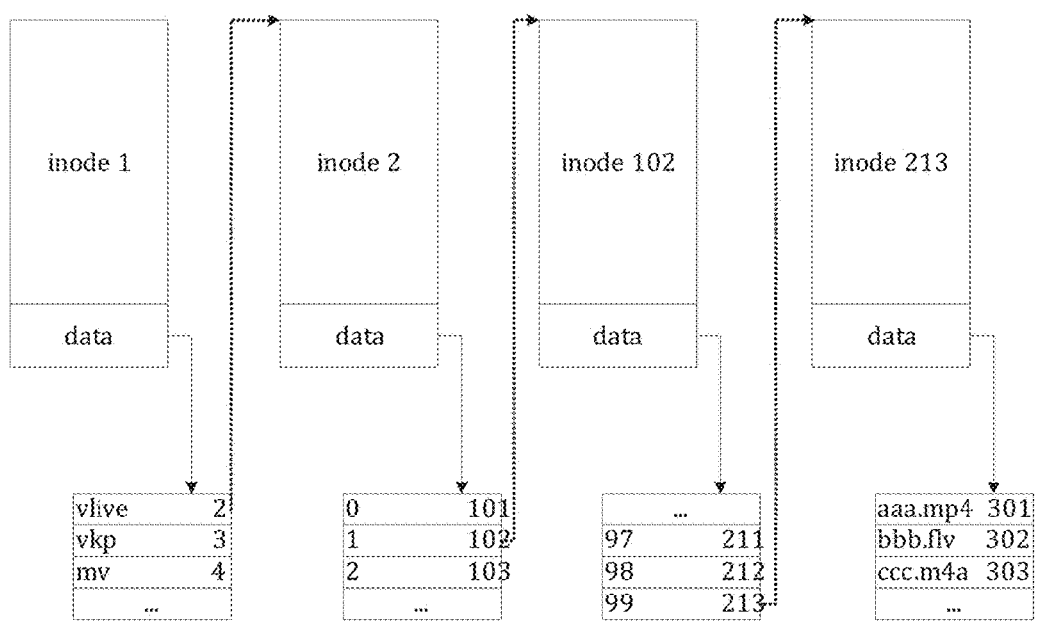
FIG. 13 is a schematic view showing a process of resolving a file path.

If a dirent of a file (or its ancestor directory) is not included in the directory entry cache "dcache", resolving of the full path of a file is a hard task and causes multiple disk access, as shown in FIG. 13. Therefore, during the directory traversal process according to embodiment of the present invention, most of the related directory entries are not included in the directory entry cache "dcache", because most of the files are rarely accessed files.

It is to be understood that directory traversal is a acyclic graph traversing process, and there are two strategies can be used, the first one is depth-first method and the second one is breadth-first method. In most of existing file systems, a directory entry is also a file (both of them have similar data structure). Thus, if an object file in an object directory is accessed, all the sub-directory entries included in the directory entry of the object directory is read one by one and compared with the object file thereby obtaining inode of the object file.

When there are a small number of files in a directory, the number of the data blocks need to be accessed for finding the object file are also fewer, and the physical block number (PBN) are directly included in the directory entry. When there are a big number of files in a directory, the number of the data blocks need to be accessed for finding the object file increase quickly, and the physical block numbers need to be indexed in a multilevel manner. To avoid the multilevel indexing of physical block numbers is the reason not to put too many files in one directory. If dividing a directory containing many files into multiple sub-directories, one more sub-directory lead to one (or more, depending on the number in the sub-directory) physical block accessing, but the disk access cost used to find the object file in the sub-directory is much smaller.

Figure 14:
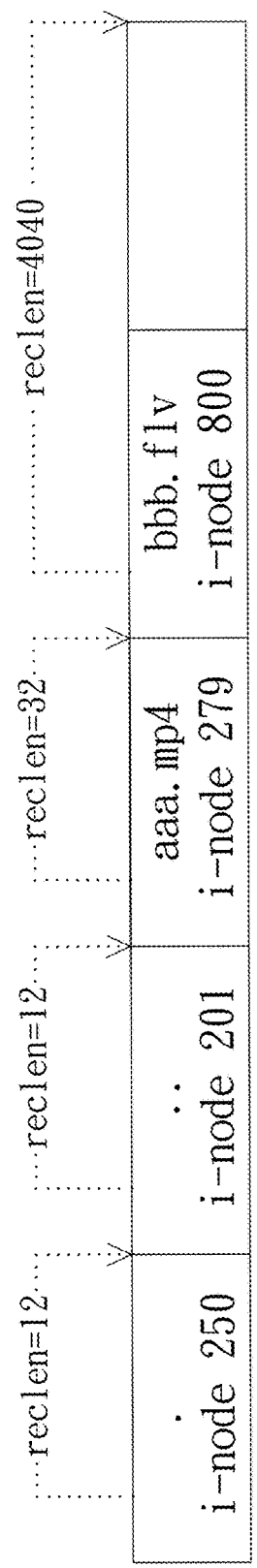
FIG. 14 is a schematic view showing a directory entry only including two media files.

In the Linux operating system, length of the directory entry is integer multiple of 4, and filename is calculated from the whole document or several slices selected according to a certain rule using a hashing algorithm. Even considering suffix of slices, the file name can be considered as having a constant length. In practical situations, the length of directory entry merely greater than 32. The size of data block is usually 4K bytes. To optimize the traversing performance, the following two conditions should be satisfied: 1. the directory entry can be read in the first data block immediately after reading inode; 2. the number of levels used to divide the directory into sub-directories should be minimized to fully use the data block containing the directory entry. Considering the above two parameters, the optimal value range of y and z are calculated and the results show that 96-128 is an appropriate range. If considering flexibility and expandability, in one example, y and z is preferably 100. FIG. 14 illustrates a data block only containing directory entries of two media files (refer also to FIG. 11).

According to the employed directory path structure, there are relatively small number of files in one directory, thus the traversing efficiency of breadth-first method is slightly higher, but the total efficiency of traversing the whole file system is not particularly larger than the depth-first method.

There are two ways, recursive method and non-recursive method, to perform the directory traversal. The recursive method can simplify the complexity of algorithm design, but a lot of stack space will be taken at the run-time. The cost of method for allocating stack space is much greater than method for allocating heap space, and also generates a large amount of code calls the function, spends much additional time to maintain the intermediate state, and also has the risk of stack overflow. As discussed above, parallel design get opposite effect in improving algorithm performance of directory traversal when there are too many I/O operations, and thus non-recursive method should be used to get better performance.

Figure 15:
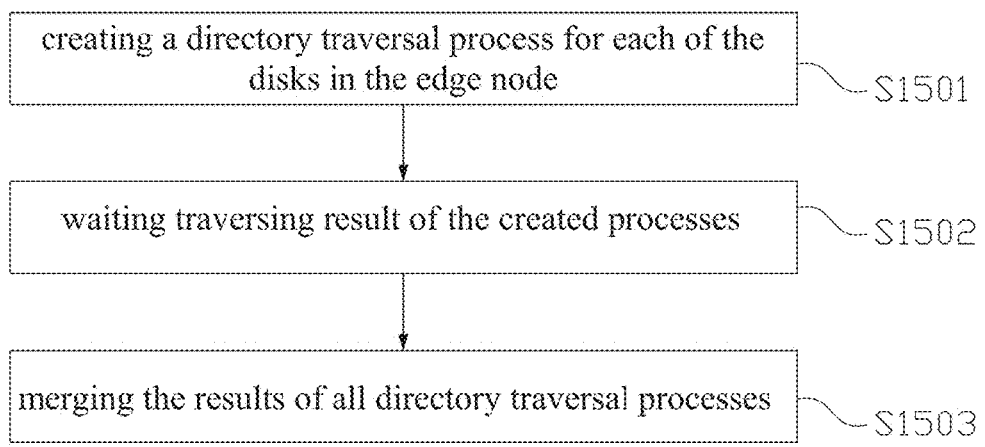
FIG. 15 is a flow chart of a directory traversal process.

Referring to FIG. 15, in one embodiment, a traversing process of the main controlling server 603 in the edge node includes the following steps.

Step S1501, creating a directory traversal process for each of the disks in the edge node.

Step S1502, waiting traversing result of the created processes.

Step S1503, merging the results of all the directory traversal processes.

The above process can be described with C++ style pseudocode as follows.

```
for(i=0; i<TOTAL_DISK && !inf.eof( ); i++)
{
    getline(inf, filename);
    {
        StartingScanDirs.push_back(filename);
        if(StartingScanDirs[count].c_str( ) == "")
            break;
        int *arg;
        arg = (int*)malloc(sizeof(int));
        *arg = count;
        //create a process for scanning the directory ( step S1501 )
        result = pthread_create(&thread[count], NULL,
            ScanDirectory, (void*)arg);
        count++;
    }
}
```

In the above code, TOTAL_DISK represents the number of disk, filename represents the filename of a file used to storing the list of files to be traversed. As describe above, each of the disks is corresponding to a unique directory. In addition, the mail controlling server 603 may map the root directory of the disk into a number of virtual directories using the network file system. Thus, prior to execute the above code, a step of obtaining the unique directory can be executed.

```
//waiting for all the processes finishing the scanning process (step S1502)
for(j = 0; j < count; j++)
    pthread_join(thread[j], NULL);
fpAllFile = fopen("filelist.txt", "w");
//merging and outputting the scanning results of all the directories (step S1503)
for(i = 0; i < count; i++)
{
    for(itSetNode = ScanResults[i].begin( ); itSetNode !=
        ScanResults[i].end( ); itSetNode++)
    fprintf(fpAllFile, "%s\n", (*itSetNode).c_str( ));
}
fclose(fpAllFile);
```

Figure 16:
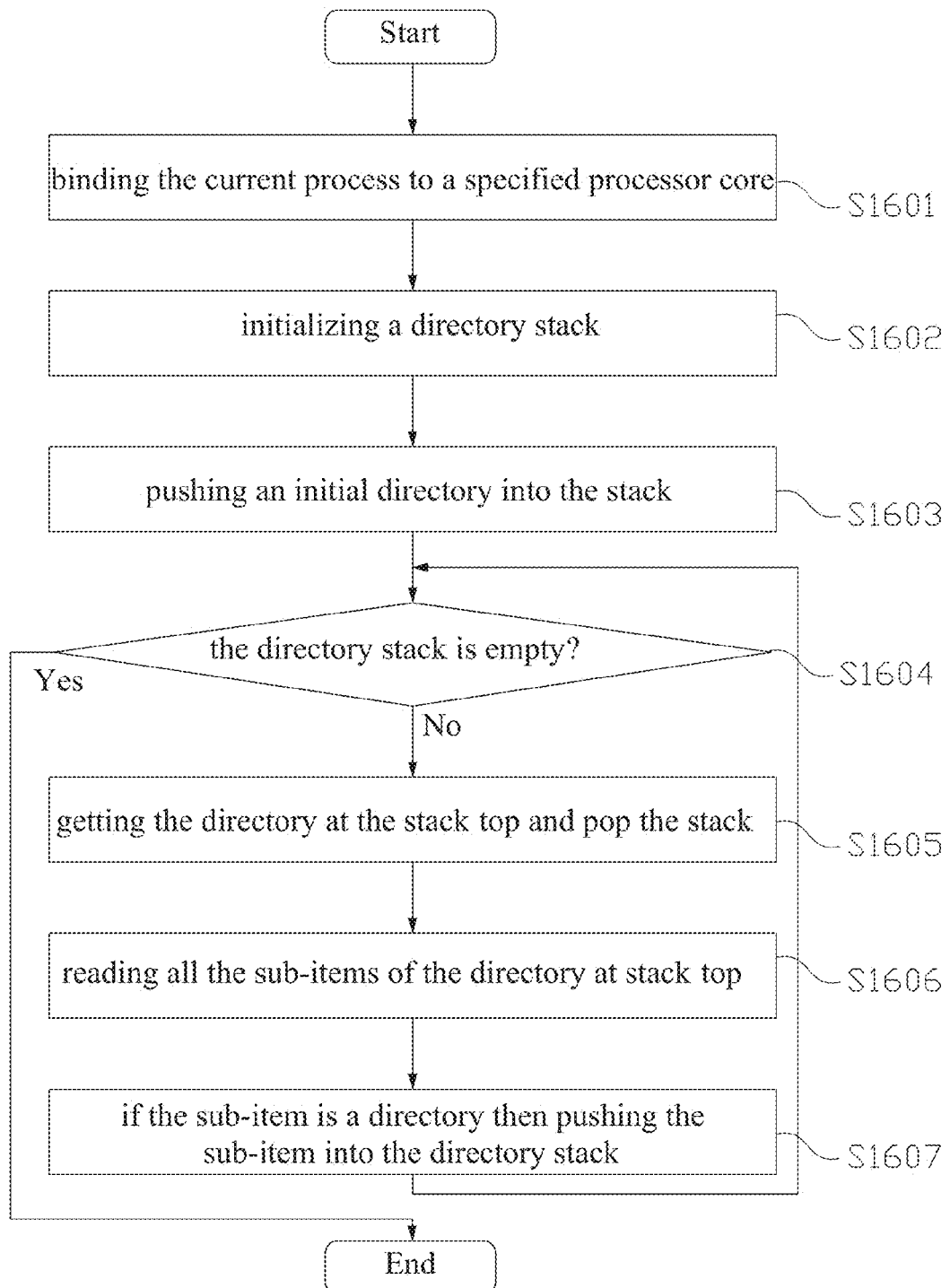
FIG. 16 is a partial flow chart of the method shown in FIG. 15.

In one embodiment, referring to FIG. 16, the process of directory traversal includes the following steps.

Step S1601, binding the current process to a specified processor core.

Step S1602, initializing a directory stack.

Step S1603, pushing an initial directory into the stack.

Step S1604, judging whether the directory stack is empty, if empty then the traversing process ends, otherwise executing the following steps until the directory stack is empty.

Step S1605, getting the directory at the top of the stack and pop the final directory from the stack.

Step S1606, reading all the sub-items of the directory at the top of the stack.

Step S1607, if the sub-item is a directory then pushing the sub-item into the directory stack; otherwise appending a record to the scanning result.

The above process of FIG. 16 can be described with C++ style pseudocode as follows.

```
void *ScanDirectory(void*arg)
{
    int id;
    id =*(int*) arg; //parsing the process ID
    CPU_ZERO(&cpu[id]);
    //the processes are bound to logic processors except the first and the
      second processor core according to the serial number (step S1601)
    CPU_SET(id %(total_cpu_num-2) + 2, &cpu[id]);
    if(pthread_setaffinity_np(pthread_self( ), sizeof(
        cpu_set_t), &cpu[id]) < 0)
    perror("pthread_setaffinity_np");
    DIR* handle;
    //initializing a directory stack (step S1602)
    stack<string> FolderSet;
    string CurrentFile, CurrentFolder;
    struct stat buf;
    struct dirent* direntp;
    if(StartingScanDirs[id].empty( ))
    {
        return NULL;
    }
    //pushing the initial directory into the stack (step S1603)
    FolderSet.push(StartingScanDirs[id]);
    //step S1604
    while(!FolderSet.empty( ))
    {
    //step S1605, getting the directory at the top of the stack and pop the
      final directory from the stack;
    CurrentFolder = FolderSet.top( );
    FolderSet.pop( );
    //step S1606, reading all the sub-items of the directory at the top of
      the stack
    if((handle = opendir(CurrentFolder.c_str( ))) == NULL)
        continue;
    else
    {
        while((direntp = readdir(handle)) != NULL)
        {
            //step S1607, if the sub-item is a directory then pushing the
              sub-item into the directory stack; otherwise appending a
              record to the scanning result.
            if((direntp->d_name[0]== '.' && (direntp->
                d_name[1]== '\0' || (direntp->d_name[1]=='.
                ' && direntp->d_name[2]== '\0'))))
                continue;
            CurrentFile = CurrentFolder + "/" + direntp->
                d_name;
            if(stat(CurrentFile.c_str( ),&buf) != 0)
                continue;
            if(S_ISDIR(buf.st_mode))
            {
                FolderSet.push(CurrentFile);
            }
            else
            {
                string s = buf.st_mtime;
                ScanResults[id].insert(pair < int, string >(
                    direntp->d_ino, CurrentFile + " " + s));
            }
        }
    }
    closedir(handle);
    }
}
```

The above described directory traversal process is applicable to various types of disks such as hard disk, solid state disks, or compact disks. However, it is to be understood that different type of disks having different characteristics, and the directory traversal process can be further optimized according to the type of the disk.

Figure 17:
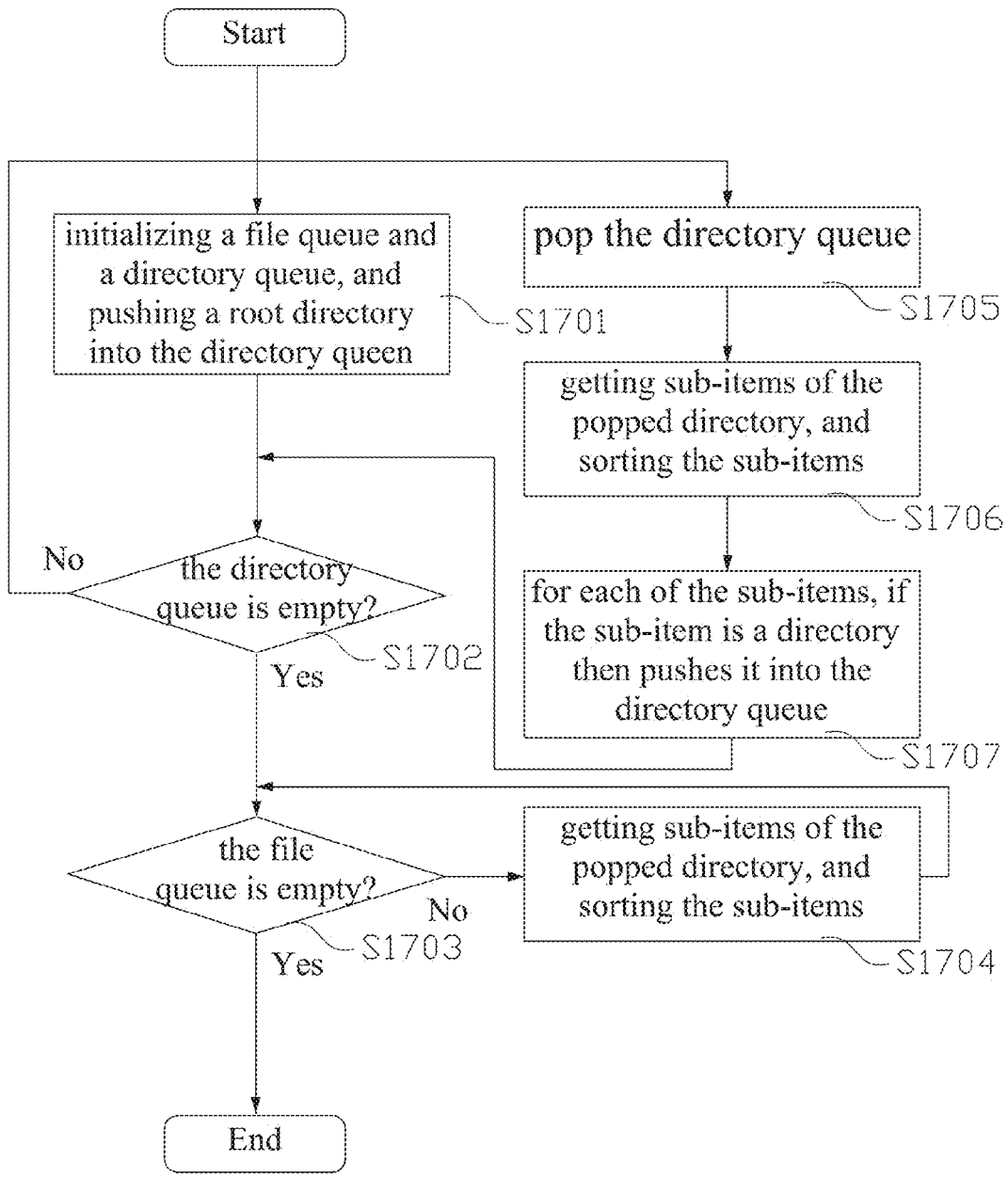
FIG. 17 is another flow chart of a directory traversal process.

For example, as shown in FIG. 17, in another embodiment, the directory traversal process may include the following steps.

Step S1701, initializing a file queue and a directory queue, and pushing a root directory into the directory queen.

Step S1702, judging whether the directory queen is empty, if empty a step S1703 is executed; otherwise a sub-traversing step is executed.

Step S1703, judging whether the file queue is empty, if yes the traversing process of the file queen ends; otherwise a step S1704 is executed.

Step S1704, pop the file queue, adding the popped file into the traversing result, and back to the step S1703.

The sub-traversing step includes the following steps.

Step S1705, pop the directory queue.

Step S1706, getting sub-items of the popped directory, and sorting the sub-items.

Step S1707, for each of the sub-items, if the sub-item is a directory then pushes it into the directory queue; otherwise if the sub-item is a file then pushes it into the file queue, and then back to the step S1702.

The above process of FIG. 16 can be described with C++ style pseudocode as follows.

```
scan(root_path)
{
    //step S1701,initializing a file queue and a directory queue,
        and pushing a root directory into the directory queen
    FileQueue, DirQuene;
    dirent d(root_path);
    //push the root directory
    DirQuene.push(d);
    FilePosMap; //for saving the scanning result
    //step S1702,judging whether the directory queen is empty
    while(!DirQuene.empty( ))
    {
        //pop the directory quene
        d=DirQuene.pop( );
        if(d.isdir( ))
            FileQuene.push(d);
        else
        {
            if(d.d_name!=".")
                path=d.parent + '/' + d.d_name;
            else
                path=d.parent;
        }
        // getting sub-items of the popped directory, and sorting
            the sub-items
        read_dir(path, dir_list);
        sort(dir_list);
        d.setdir( );
        it=dir_list.begin( );
        // for each of the sub-items, if the sub-item is a directory
        then pushes it into the directory queue; otherwise if the
        sub-item is a file then pushes it into the file queue
        while(it!=dir_list.end( ))
        {
            if(it-d_name!="." or "..")
            {
                if(it->isdir( ))
                    DirQuene.push(*it);
                else
                    FileQuene.push(*it);
            }
            ++it;
        }
    }
    // judging whether the file queue is empty
    while(!FileQuene.empty( ))
    {
        //popping the file queue, adding the popped file into the
            traversing result
        d=FileQuene.pop( );
        FilePosMap.insert(d.d_ino,d.full_path( ));
    }
}
```

The pseudocode of the above read_dir function for getting sub-items of a directory is described as follows.

```
read_dir(path, dir_list)
{
    fd=open(path);
    written=0, offset=0;
    buf[BLOCK_SIZE];
    //reading directory entries having a length of BLOCK_SIZE
    into a directory entry struct "dirp" using system calls
    written=syscall(SYS_getdents, fd, dirp, BLOCK_SIZE);
    while(written>0)
    {
        if(offset< written)
        {
            os_dirent *s;
            s=buf+offset;
            dirent d;
            d.d_ino=s->d_ino;
            d.d_name=s->d_name;
            d.d_type=*(s+s->d_reclen-1);
            d.parent=path;
            //adding read directory entries in the returned result
            dir_list.push_back(d);
            offset += s->d_reclen;
        }
        written=syscall(SYS_getdents, fd, dirp, BLOCK_SIZE);
    }
}
```

A large number of experiments show that stat( ) call will consume a lot of time in program containing operations to meta-information of files. Furthermore, in the standard Unix API, readdir ( ) returns the name of the file in lexicographical order, the result is not relate to position of the physical block, and this exacerbates the consumption of stat( ) call. As a result, the head arm addresses back and forth during a process of getting the meta-information of a file even if accessing information of different file in a same directory.

In above embodiment, the read_dir( ) function is rewritten to improve the performance. In the new function, all the directory entries in a data block is read as a whole, and the directory entries are sorted by inode. The sorted directory entries improve the efficiency. Statistical results show that, when performing directory traversal in the disk, the method shown in FIG. 17 has an efficiency improvement of 30% to 300% compared with the method shown in FIG. 15.

In the above traversing method, the mtime property is not used. However, the mtime property can also be used to judge whether a file should be deleted.

Embodiment 1

Figure 18:
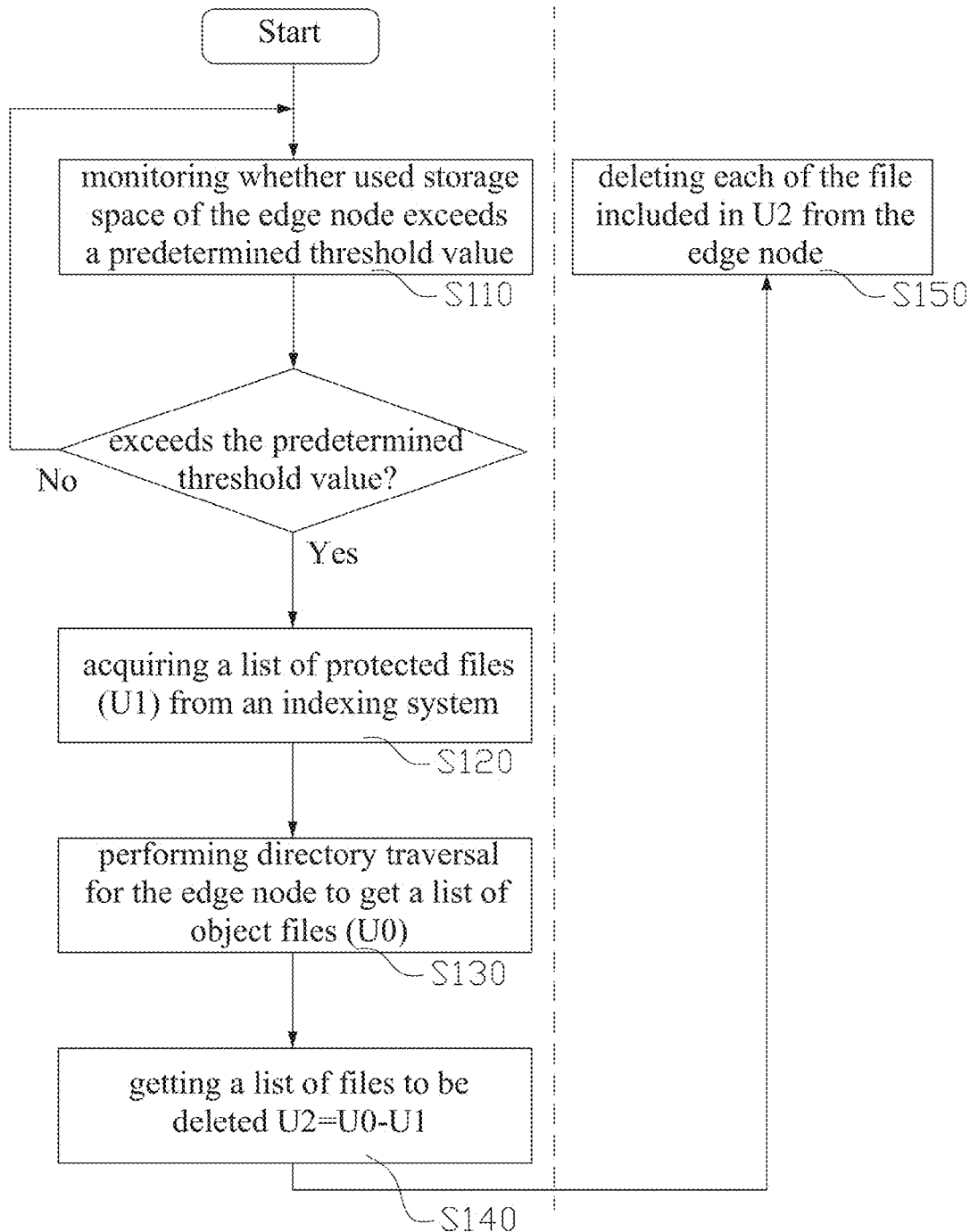
FIG. 18 is a flow chart of a method for managing content in a CDN according to a first embodiment.

FIG. 18 is a flow chart of a method for managing content in a CDN according to a first embodiment. This method can be executed by the main controlling server 603 shown in FIG. 8. The method includes the following steps.

Step S110, monitoring whether used storage space of the edge node exceeds a predetermined threshold value, if yes the following steps S120 to S150 are executed. The step S110, for example, is executed by an agent program in the main controlling server 603. As described above, the main controlling server 603 mounts disks of storage servers 604 into a virtual directory using the network file system, and then get the usage information of storage space of storage server 604 by querying properties of the directory. If used storage space of the edge node exceeds a predetermined threshold value, for example, 90%, a file deleting process is launched, that is, the steps S120 to S150 are executed.

Step S120, acquiring a list of protected files (U1) from an indexing system. Referring to FIG. 8, database in the indexing system 608 stores access log file of the files in the edge node, and also stores the file need to be protected. In one embodiment, the list of protected files U1 comprises: a list of files that has been accessed for at least one time in a predetermined first time range (t1), a list of files that are uploaded to the edge node but are not published yet in a predetermined second time range (t2), and a list of files that should be protected permanently.

Because the indexing system 608 is within an intranet, and all the edge nodes are directly connected to the internet, communication between the main controlling server 603 and the indexing system 608 can be through a proxy server for ensuring the safety. Thus, the step S120 may include the following steps.

The main controlling server 603 sends a file deleting message to the proxy server 607.

The proxy server 607 gets parameters t1, t2 and t3 for performing the file deleting process. The parameters t1, t2 and t3 can be inputted by the user, or read from predetermined configuration information.

The proxy server 607 sends a file acquiring request and the parameters t1, t2 to the indexing system 608.

It is to be understood that the parameters t1 and t2 can be directly included in the file acquiring request, or sent to the indexing system 608 separately.

The indexing system 608 returns the list of the files to be protected U1 according to the file acquiring request and the parameters t1, t2.

The proxy server 607 receives the list of the files to be protected returned from the indexing system 608, and sends the list of the files to be protected to the main controlling server 603.

Step S130, performing directory traversal for the edge node to get a list of object files (U0) whose difference between latest modified time and the current time exceeds a predetermined time range.

The detail process of traversing the directory can refer to the above described directory traversal in network file system.

The step S130 can be launched according to a directory traversal request. The directory traversal request can be sent by the proxy server 607. For example, after receiving the file deleting message, the proxy server 607 sends the directory traversal request and parameter t3 to the main controlling server 603.

The predetermined time range in step S130 can be the parameter t3. In one embodiment, the parameter t3 is a integer greater than 1, for example, 30 days.

Step S140, getting a list of files to be deleted U2=U0−U1.

Step S150, deleting each of the file included in U2 from the edge node.

The step S140 and the step S150, for example, can be executed by the main controlling server 603.

As shown in FIG. 15, the step S110 and the step S150 can be performed simultaneously, or in parallel. That is, the step S110 and the step S150 can be executed by two separate processes. Furthermore, the steps S110, the steps S120 through S140, and the step S150 can be executed by separate processes. For example, the step S110 can be executed by a monitoring process, the steps S120 through S140 can be executed by a process for getting the list of files to be deleted, and the step S150 can be executed by a file deleting process. The processes run individually, but can receive parameters sent from the other processes. For example, the file deleting process receives the list of files to be deleted as the parameter from the process for getting the list of files to be deleted.

In addition, it is to be noted that in the step S150, if the main controlling sever 603 fails to delete a file, the reason may be disk error, network error or network file system error. In such situation, the main controlling server 603 may send a file deleting request to the storage server 604, and then the storage server 604 could delete the file specified by the file deleting request. By using this method, failure of file deleting caused by the network error or the network file system error can be avoided.

The method provided by the present embodiment has the following advantages.

1. It is not necessary to maintain a global index of all resources in edge nodes, and it is also not necessary to sort the resources according to access frequency. Thus, the function of edge nodes in a CDN is simplified in the greatest extent, hardware consumption of edge nodes is reduced, and the performance of edges is improved.

2. It is not necessary to open the atime property in the web server and the storage server of edge nodes in a CDN. Accordingly, read operation of file doesn't cause a write operation to a physical data block. Unnecessary disk write operations are avoided, service performance is improved, and the energy consumption is reduced.

3. The number of files to be deleted can be adjusted flexibly with several simple and clear parameters.

Embodiment 2

Figure 19:
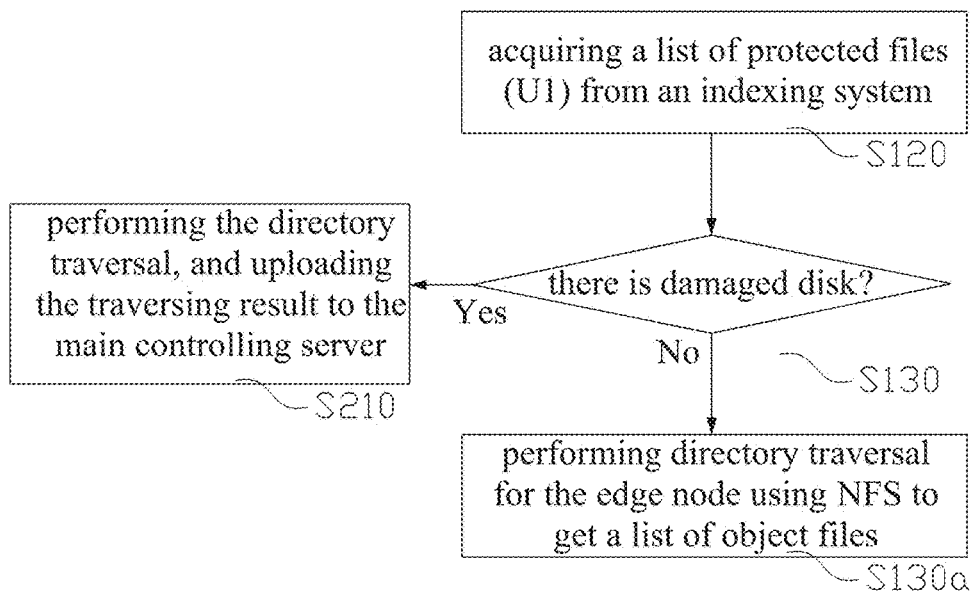
FIG. 19 is a flow chart of a method for managing content in a CDN according to a second embodiment.

FIG. 19 is a flow chart of a method for managing content in a CDN according to a second embodiment. The method of the present embodiment is similar to the first embodiment, except the present method further includes the following steps after executing the step S120: detecting whether there is damaged storage disk, if yes a step S210 is executed; otherwise a step S130a is executed.

Step S130a, performing directory traversal for the edge node using network file system to get a list of object files (U0) whose difference between latest modified time and the current time exceeds a predetermined time range.

As described above, the main controlling server 603 can mount different storage server 604 to a virtual directory using network file system, and thus the directory traversal can be executed in the main controlling server 503.

Step S210, at the storage server 604 having the damaged storage disk, performing the directory traversal, and uploading the traversing result to the main controlling server 603. Then, the main controlling server 603 can merge the traversing result to get the list of object files U0.

According to the method of the present embodiment, a better deal of damaged disk during the directory traversal process is provided.

Embodiment 3

Figure 20:
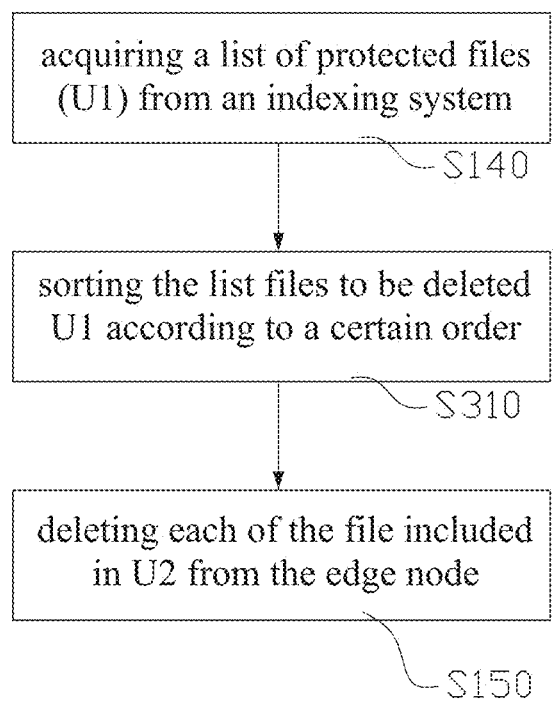
FIG. 20 is a flow chart of a method for managing content in a CDN according to a third embodiment.

FIG. 20 is a flow chart of a method for managing content in a CDN according to a second embodiment. The method of the present embodiment is similar to the first embodiment, except the present method further includes the following steps: step S310, sorting the list files to be deleted U1 according to a certain order, such as inode, the number of the data block containing the inode, the number of the data block containing the directory entry of the current file. Then, the magnetic head can only move along one direction during the process of deleting the files thereby avoiding too many time-wasting mechanical movement of head arm. Thus, the speed of deleting files is increased.

Figure 21:
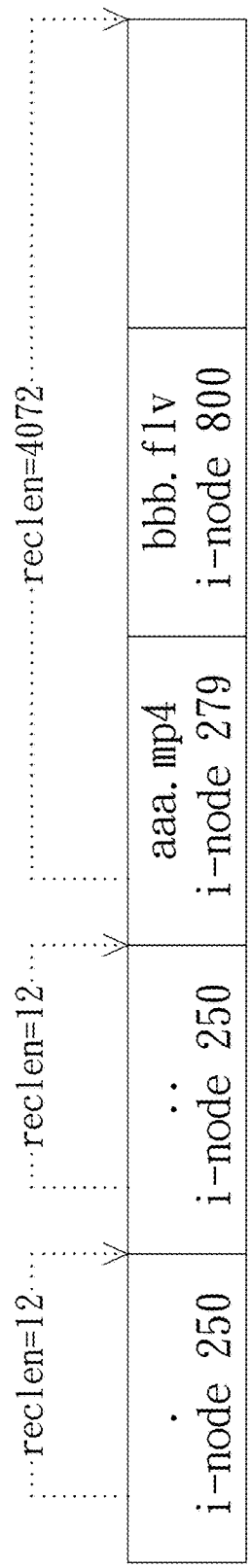
FIG. 21 is a schematic view illustrating how the directory entry is change when a file is deleted.

Referring both to FIGS. 14 and 21, when a file is deleted, the operation to the directory entry is to increase the length value of the previous directory entry to a starting index of a directory entry next to the current directory entry. For example, compared with the state shown in FIG. 14, FIG. 21 illustrates the state that a file bbb.flv (whose length is 4040) is deleted, then the length value of the previous directory entry (corresponding to the file aaa.mp4) is increased from 32 to 4072 (32+4040).

In the Ext3 file system, the inode index in the directory entry is not removed when a file is deleted, but the value of the inode index is set to zero and the block pointer in the inode and the block pointer in the indirect block are removed. The Ext2 file system has just has opposite configurations, that are the inode index in the directory entry is not removed, but the block pointer in the inode and the block pointer in the indirect block are not removed.

Based on a lot experiments, inode index, physical block index, and logic block index have linear correlation or present a high degree of linear correlation.

Generally, $inode(a) < inode(b) \Rightarrow block(inode(a)) \le block(inode(b))$ Thus, these information can be used to arrange I/O operations appropriately to reduce the time used by the head arm to address back and forth.

Embodiment 4

Figure 22:
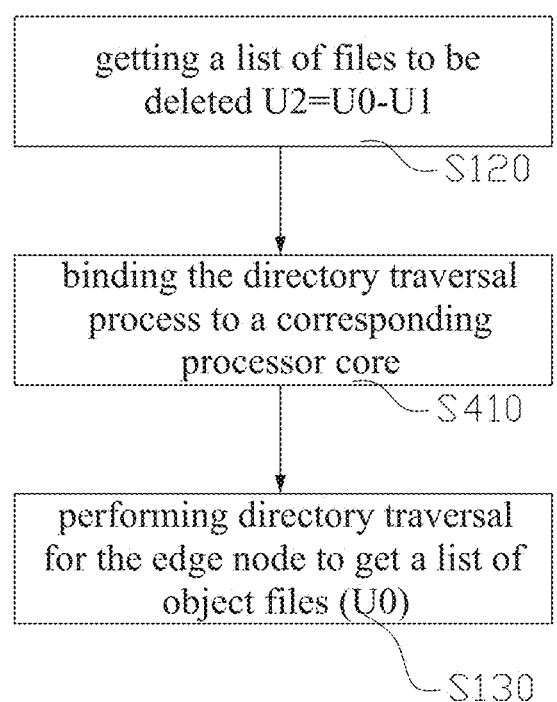
FIG. 22 is a flow chart of a method for managing content in a CDN according to a third embodiment.
Figure 23:
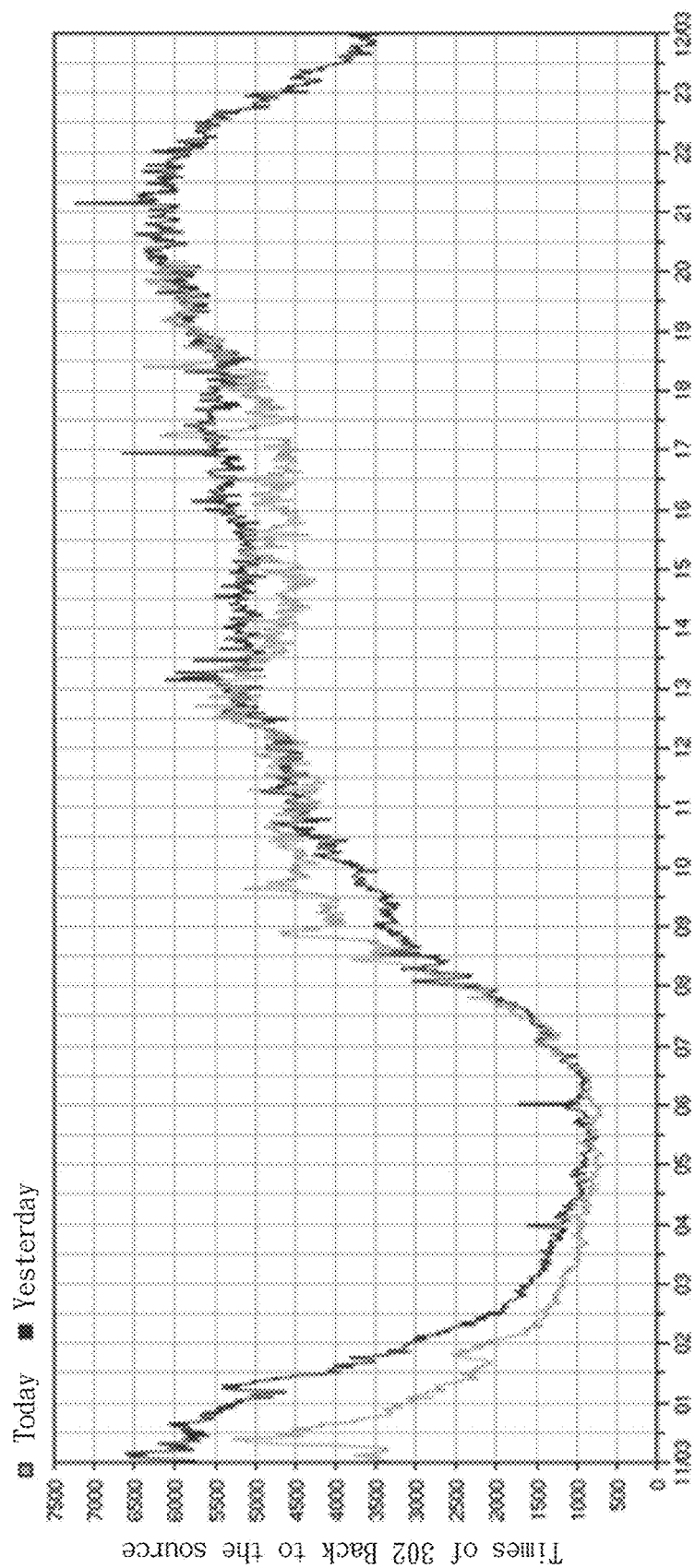
FIGS. 23 to 27 are schematic views illustrating statistical results of 302 back to the source to all the resources, UGC resources, news, music, and videos, respectively.

FIG. 22 is a flow chart of a method for managing content in a CDN according to a first embodiment. The method of the present embodiment is similar to the first embodiment, except the present method, between the step S120 and the step S130, further includes step S410, binding the directory traversal process to a corresponding processor core.

The processor core means the logic processor. In one embodiment, the index number of the corresponding process core is calculated according to following formula: id %(total number of processor cores −2)+2, wherein id represents the process ID.

As seen from the above formula, the index number of the corresponding processor core will never be 1 or 2. Therefore, the directory traversal process will never be bound to the processor cores numbered 1 or 2. The purpose of this design is to avoid binding directory traversal process to the processor cores numbered 1 or 2 thereby avoiding the directory traversal process affect the normal processes in the server. The normal processes provide services for processing network connections, detecting network speed and etc. By this method, a response time of the system is ensured.

The object of binding different directory traversal processes to different process cores is to avoid the cache missing and/or the cost of the flow line is broken when the processor context is switched.

According to the method of the present embodiment, the performance of directory traversal is improved and the time cost to traverse the directory is reduced.

It is to be noted that the methods in above embodiments are capable of significantly improving the efficiency of content managing in a CDN, and more particularly improving the efficiency of deleting files actively. For example, if conventional scripts files are used to delete contents, the directory traversal process of an edge node takes about 10 hours because the scripts can only be executed in a serial manner, and the time used to delete the files need a day. If t1 is set to 90 days and t2 is set to 30 days, the time used to get the list files to be deleted is about 5 minutes. Thus, the total time cost usually exceeds one whole day. By using the methods of the above embodiments, the directory traversal process takes 2 to 4 minutes, and deleting the files takes 4 to 10 minutes. Considering the process of getting the list of files to be deleted and the directory traversal process can be executed in parallel, the total time is not more than 15 minutes. As the total time cost is very short, a period of minimum user visits can be selected to perform the file deleting process to minimize the impacts of the file deleting operation to the user access.

According to a practical example, the file deleting process is launched at 8:30 am in an edge node, about ⅕ of files is deleted, the times of 302 back to the source are counted for all the resources, UGC resources, news, music, and videos, respectively. The statistical results are shown in FIGS. 23 to 27, respectively. In these figures, the dark line represents the data of the previous day, and the light color line represents the data after deleting the files.

As seen in FIGS. 23 to 27, only news produce back to the source requests in a controllable range. Further researching shows that the reasons is:

1. A lot of hot events took place on the current day, and the resources are not distributed to the edge nodes yet.

2. Some other earlier news is semantically related to current news and is recommended by a recommending system and causes a lot user requests.

It is to be understood that these two reasons are both not the problems should be considered to delete the files. In summary, the methods of the above embodiments can delete huge amount of files quickly while not significantly increase the times of back to the source, and therefore the methods facilitate the stable running of the edge nodes in a CDN.

Embodiment 5

Figure 24:
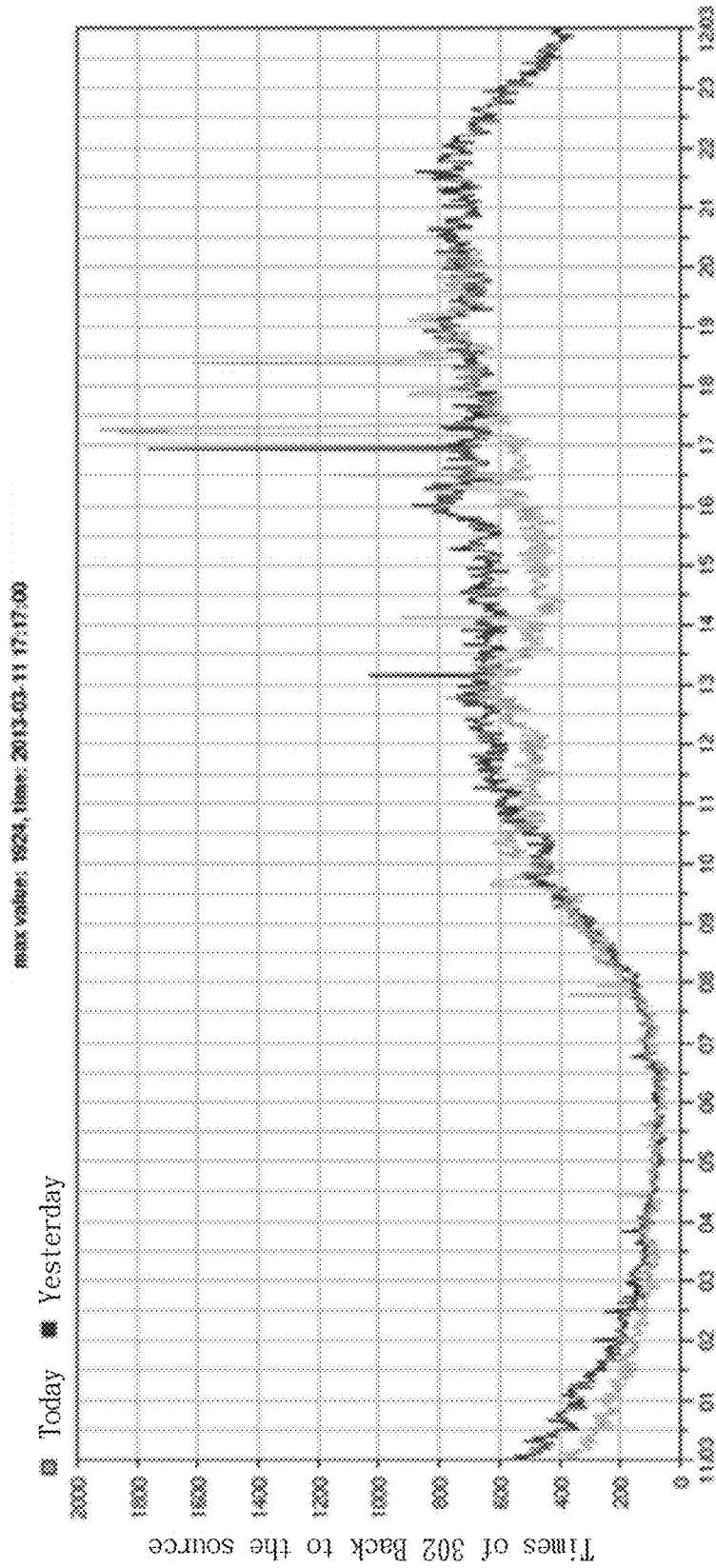

The present embodiment provides an apparatus for managing content in a CDN. Referring to FIG. 24, the apparatus includes a monitoring module 10 and a file deleting module 20.

The monitoring module 10 is configured for monitoring whether used storage space of an edge node exceeds a predetermined threshold value, if yes then calls the file deleting module 20.

The file deleting module 20 includes a first acquiring unit 21, a directory traversal unit 22, a second acquiring unit 23 and a file deleting unit 24.

The first acquiring unit 21 is configured for getting a list of files to be protected U1 from an indexing system.

The directory traversal unit 22 is configured for performing directory traversal for the edge node to get a list of object files (U0) whose difference between latest modified time and the current time exceeds a predetermined time range.

The directory traversal unit 22 may employ breadth-first traversing and non-recursive traversing during the process of directory traversal. In addition, for directories in a same disk, the directory traversal process should be executed in a serial manner, and the directory traversal processes of different disks should be executed in parallel. Furthermore, the directory traversal process can be bound to a corresponding processor core during the traversing process. The traversing result can further be sorted by the inode.

The second acquiring unit 23 is configured for getting a list of files to be deleted U2=U0−U1.

The file deleting unit 24 is configured for deleting each of the file included in U2 from the edge node.

In one embodiment, the list of protected files U1 comprises: a list of files that has been accessed for at least one time in a predetermined first time range, a list of files that are uploaded to the edge node but are not published yet in a predetermined second time range, and a list of files that should be protected permanently.

In one embodiment, the first acquiring unit 21 is configured for performing the following steps:

sending a file deleting message to a proxy server;

the proxy server sends a file acquiring request to the indexing system according to the file deleting message to get the list of files to be protected U1; and receiving the list of files to be protected U1 from the proxy server.

Figure 25:
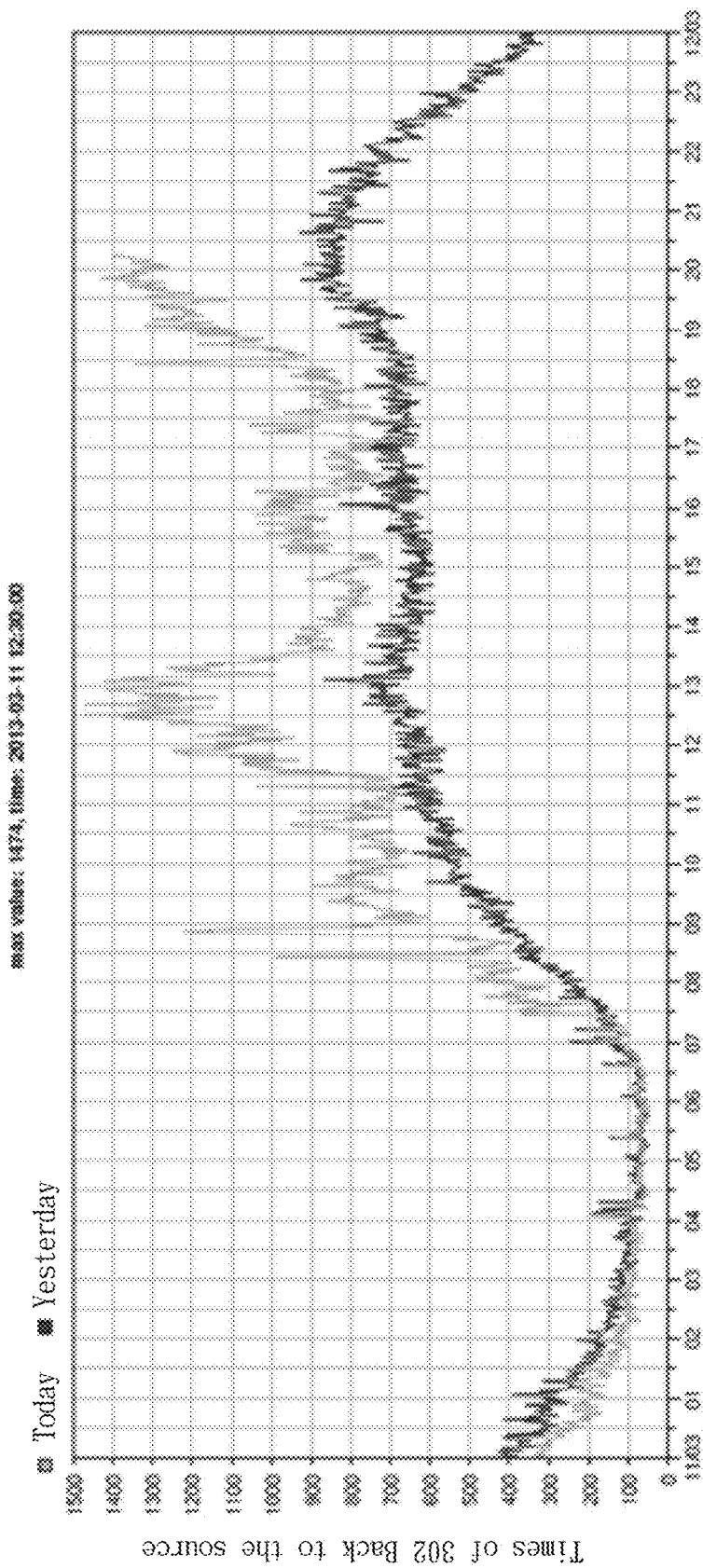
Figure 26:
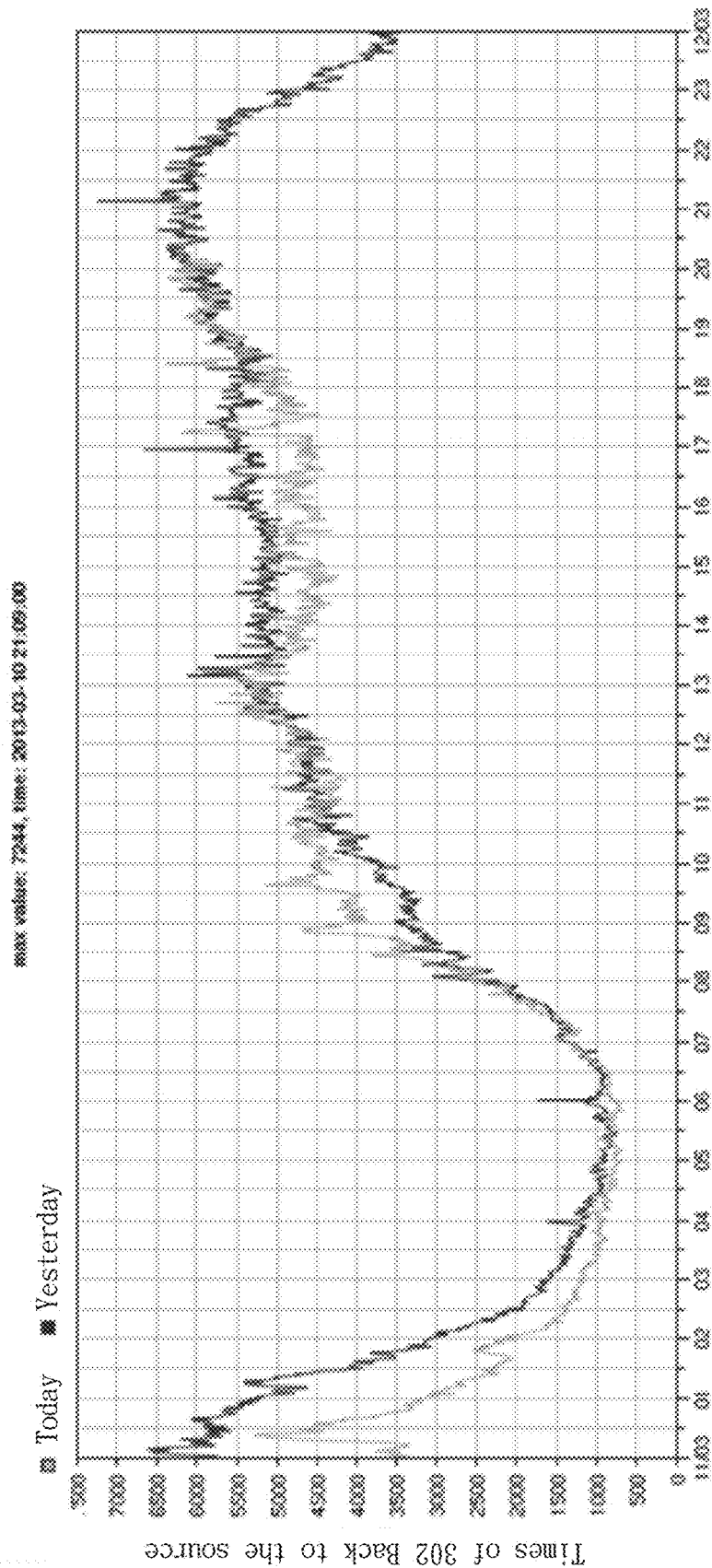
Figure 27:
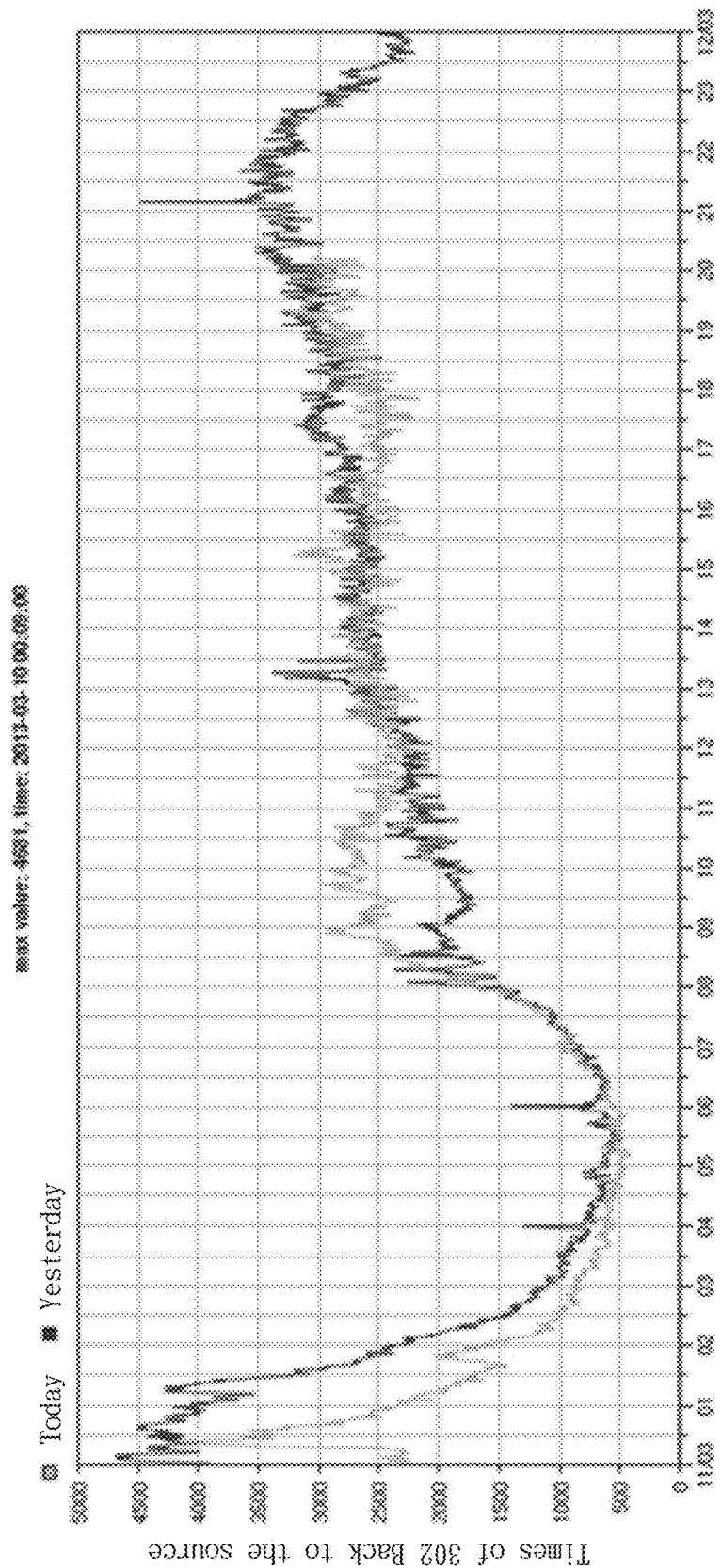
Figure 28:
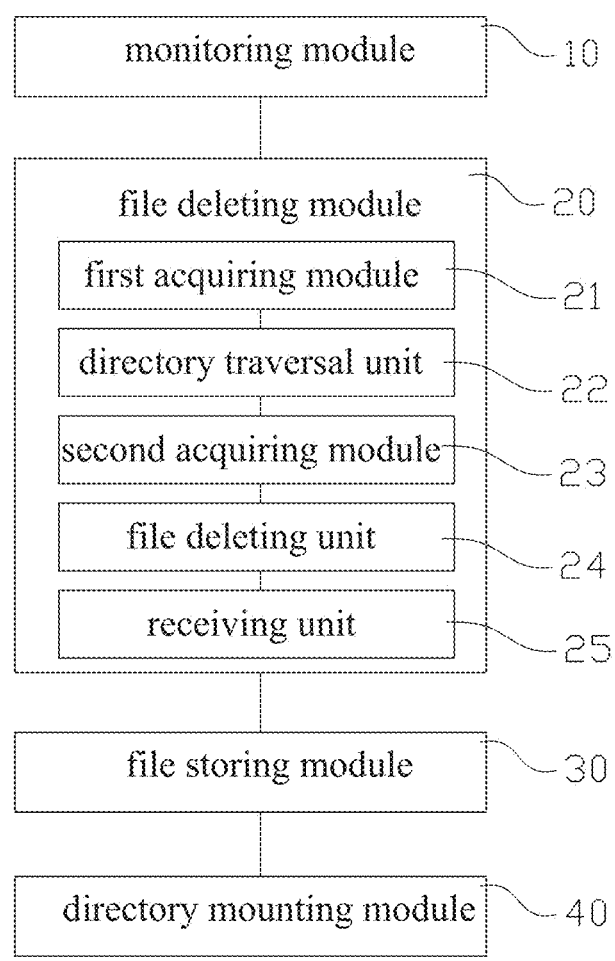
FIG. 28 is a block diagram of an apparatus for managing content in a CDN.
Figure 29:
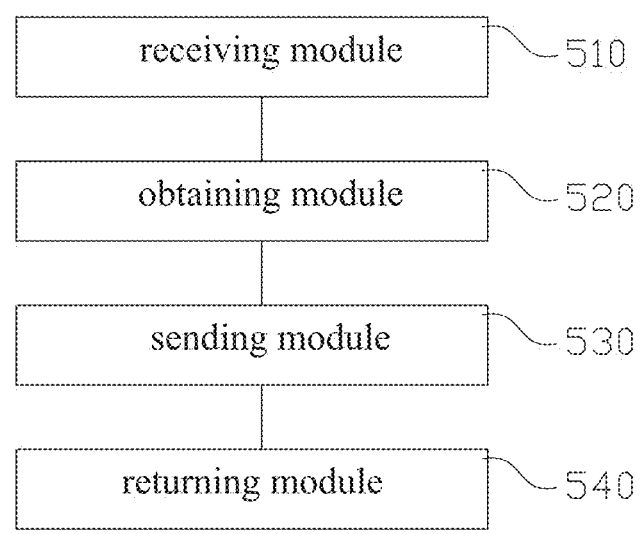
FIG. 29 is a block diagram of a proxy server.

As shown in FIG. 25, the proxy server includes a receiving module 510, an obtaining module 520, a sending module 530 and a returning module 540.

The receiving module 510 is configured for receiving the file deleting message form the first acquiring module 21. The obtaining module 520 is configured for obtaining the parameters used in the file deleting process (e.g., t1, t2 and t3). The sending module 530 is configured for sending a file acquiring request, the parameters t2 and t3 to the indexing system. The sending module 530 is further configured for sending a directory traversal request to the main controlling server 503 and the parameter t3. The returning module 540 is configured for returning the list of files to be protected got from the indexing system to the main controlling server 603.

The file deleting module 20 further includes a receiving unit, configured for receiving the directory traversal request and the predetermined time range from the proxy server, and the directory traversal unit 22 is launched according to the directory traversal request.

In addition, as shown in FIG. 24, the apparatus may further a file storing module 30 and a directory mounting module 40. The file storing module 30 is configured for receiving a file sent form a client program, and storing the received file in a storage device connected to a storage server in the edge node.

The saving path of the received file is: /DATAx/(CHANNEL/)y/z/filename.

In the above formula, DATAx represents a root directory of a disk numbered x, CHANNEL represents the channel name, filename represents the file name of the received file, and x, y, z satisfy the following conditions:

$$\begin{cases} x = DiskID, & DiskID \leq 256/N; \\ y = hash_1(filename) \bmod A, & 96 \leq A \leq 128; \\ z = hash_2(filename) \bmod B, & 96 \leq B \leq 128. \end{cases}$$

wherein N represents the number of edge nodes, hash1 and hash2 are two different hash functions.

The directory mounting module 40 is configured for mounting files in storage devices connected to the edge node into a virtual directory using a network file system prior to the directory traversal unit perform the directory traversal process. The virtual directory is:

/data/k/(CHANNEL/)y/z/filename;

wherein k≤10000, and k, x are of uniform many to one mapping.

By using the apparatus of the present embodiment, the performance of directory traversal is improved and the time used to traversing the directory is reduced.

Embodiment 6

Figure 30:
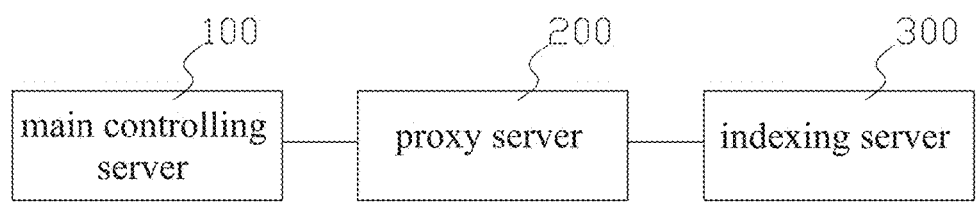
FIG. 30 is a block diagram of a system for managing content in a CDN.

Referring to FIG. 30, the present embodiment provides a system for managing content in edge nodes of a CDN. The system includes a main controlling server 100, a proxy server 200 and a indexing server 300.

The main controlling server 100 has a similar structure to the main controlling server 603 shown in FIG. 8, the proxy server 200 and the indexing server 300 are similar to the proxy server 607 and the indexing system 608, respectively, and details can refer back to FIG. 8.

The main controlling server 100 is configured for monitoring whether used storage space of the edge node exceeds a predetermined threshold value; if yes then acquiring a list of protected files (U1) from the indexing system if the used storage space exceeds the predetermined threshold value; performing directory traversal for the edge node to get a list of object files (U0) whose difference between latest modified time and the current time exceeds a predetermined time range; getting a list of files to be deleted U2=U0−U1; and deleting each of the file included in U2 from the edge node.

The main controlling server 100 is further configured for receiving a file sent form a client, and saving the received file in a storage device connected to a storage server in the edge node.

The saving path of the received file is: /DATAx/(CHANNEL/)y/z/filename.

In the above formula, DATAx represents a root directory of a disk numbered x, CHANNEL represents the channel name, filename represents the file name of the received file, and x, y, z satisfy the following conditions:

$$\begin{cases} x = DiskID, & DiskID \leq 256/N; \\ y = hash_1(filename) \bmod A, & 96 \leq A \leq 128; \\ z = hash_2(filename) \bmod B, & 96 \leq B \leq 128. \end{cases}$$

wherein N represents the number of edge nodes, hash1 and hash2 are two different hash functions.

The main controlling server 100 is further configured for mounting files in storage devices connected to the edge node into a virtual directory using a network file system prior to the directory traversal unit perform the directory traversal process. The virtual directory is: /data/k/(CHANNEL/)y/z/filename;

wherein k≤10000, and k, x are of uniform many to one mapping.

In one embodiment, the main controlling server 100 employs a breadth-first method to traverse the directories.

In one embodiment, the main controlling server 100 employs a non-recursive method to traverse the directories.

In one embodiment, the main controlling server 100 uses a serial manner to traverse the directories in a same disk, and uses a parallel manner to traverse the directories in different disks.

In one embodiment, the main controlling server 100 binds the directory traversal process to a corresponding processor core when performing the directory traversal.

In one embodiment, the main controlling server 100 further sorts the traversing results by inode, the index of the data block containing the inode, or the index of the data block containing the directory entry.

The proxy server 200 is configured for providing a communication path between the mail controlling server 100 and the indexing server 300. In detail, the proxy server 200 is configured for sending the first predetermined time range and the second predetermined time range to the indexing server 300, and getting the predetermined time range according to the user inputting or preset configuration information.

The indexing server 300 is configured for returning the list of file to be protected U1 according to the file acquiring request.

The main controlling server 100 is further configured for receiving a directory traversal request form the proxy server 200 and the predetermined time range. The main controlling server 100 launches the directory traversal process according the directory traversal request.

By using the apparatus of the present embodiment, the performance of directory traversal is improved and the time used to traversing the directory is reduced.

The above descriptions are only preferred embodiments, and are not intended to limit the present invention. Any one of ordinarily skilled in the art would make replacements or modifications to the above technical solutions within the spirit and the scope of the present invention to obtain equivalent embodiments, and these equivalent embodiments should also be included in the scope of the present invention.

INDUSTRIAL PRACTICITY

The present invention provides a method of making an emergency call in a mobile electronic device. The current location of the mobile electronic device is obtained automatically, and the emergency message sent to the serve includes the current location. Therefore, the server is capable of finding out terminals around the current location, and the efficiency of providing emergency aid is improved.

What is claimed is:

1. A method for managing content in a content distribution network (CDN), the CDN comprising an edge node of the CDN that includes a main controlling server and a storage device, and an indexing system connected to the main controlling server, the method comprising executing the following steps at the edge node:
    saving files delivered from a data center of the CDN to the storage device of the edge node;
    monitoring whether used storage space of the storage device of the edge node exceeds a predetermined threshold value, the storage device being a non-volatile memory;
    acquiring a list of protected files from the indexing system in response to determining that the used storage space in the non-volatile memory exceeds the predetermined threshold value;
    performing directory traversal for the files stored in the storage device of the edge node to extract a list of object files from the stored files, including: for each stored file, determining whether a difference between latest modified time of the stored file and the current time exceeds a predetermined time range, and adding the stored file to the list of object files if it is determined that the difference exceeds the predetermined time range;
    getting a list of files to be deleted, wherein each of the files to be deleted is in the list of object files and is not in the list of protected files; and
    deleting each of the files included in the list of files to be deleted from the storage device of the edge node,
    wherein the step of acquiring the list of protected files comprises:
        in response to determining that the used storage space of the storage device exceeds the predetermined threshold value, sending, by the main controlling server of the edge node, a deleting warning message to a proxy server,
        controlling the proxy server to send a file acquiring request to the indexing system using the deleting warning message, wherein the proxy server obtains the list of protected files from the index system in response to the deleting warning message, and the protected files are excluded from the list of files to be deleted; and
        receiving the list of protected files returned by the proxy server.

2. The method of claim 1, wherein:
    the indexing system stores and regularly updates: file access records that merge global access statistics in the CDN, a first data table identifying uploaded but not-published files, and a second data table identifying files to be protected from being deleted in the CDN; and
    the list of protected files comprises: a list of files that has been accessed for at least one time in a predetermined first time range based on the file access records stored in the indexing system, a list of files that are uploaded to the edge node but are not published yet in a predetermined second time range based on the first data table stored in the indexing system, and a list of files that should be protected permanently based on the second data table stored in the indexing system.

3. The method of claim 1, wherein the step of acquiring the set of files comprises:
    in response to determining that the used storage space exceeds the predetermined threshold value, sending, by the main controlling server of the edge node, a deleting warning message to a proxy server, the deleting warning message being configured for controlling the proxy server to send a file acquiring request to the indexing system thereby obtaining the list of protected files; and
    receiving the list of protected files returned by the proxy server.

4. The method of claim 1, wherein the data transmission to the proxy server is encrypted.

5. The method of claim 1, further comprising:
    receiving a directory traversal request and the predetermined threshold value from the proxy server; the step of performing the directory traversal for the edge node is started after receiving the directory traversal request.

6. The method of claim 1, further comprising, at the proxy server, sending the first time range and the second time range to the indexing system.

7. The method of claim 1, further comprising, at the proxy server:
    getting the predetermined threshold value from user inputting; or
    getting the predetermined threshold value from a preset configuration information.

8. The method of claim 1, further comprising:
    receiving a file with a filename sent from a client;
    determining a saving directory of the file, wherein the saving directory has at least three levels, including: a root directory, a first subdirectory, and a second subdirectory; and
    saving the file in the storage device of the edge node, wherein determining the saving directory of the file further comprises:
        determining the root directory based on a number of the storage disks included in the storage device of the edge node, determining the first subdirectory based on a remainder of a first hash value of the filename divided by a first integer; and determining the second subdirectory based on a remainder of a second hash value of the filename divided by a second integer, wherein the first hash value of the file name and the second hash value of the file name are obtained based on different hash functions.

9. The method of claim 8, prior to perform the directory traversal, further comprising:

mounting files in the storage device of the edge node into a virtual directory via a network file system, wherein the virtual directory is determined based on saving directories of stored files, and files stored on a same storage disk are mounted in multiple corresponding virtual subdirectories uniformly.

10. The method of claim 1, wherein the directory traversal is performed in a manner of breadth-first traversal.

11. The method of claim 1, wherein the directory traversal is performed in a manner of non-recursive traversal.

12. The method of claim 1, during the directory traversal for the edge node, different directories in a same storage device is traversed in a serial manner, while directory traversal for different storage devices of the edge node is performed in a parallel manner.

13. The method of claim 1, further comprising binding a process for performing the traversing to a certain processor core during the directory traversal.

14. The method of claim 1, further comprising: sorting a traversing result of the directory traversal according to inode, an index of a data block containing the inode, or an index of a data block containing a directory entry.

15. A system for managing content in a content delivery network, the system comprising:

an edge node and an indexing server;

wherein the edge node includes a main controlling server and a storage device, the main controlling server being configured for:

saving files delivered from a data center of the CDN to the storage device of the edge node;

monitoring whether used storage space of the storage device of the edge node exceeds a predetermined threshold value, the storage device being a non-volatile memory;

acquiring a list of protected files from the indexing system in response to determining that the used storage space in the non-volatile memory exceeds the predetermined threshold value;

performing directory traversal for the files stored in the storage device of the edge node to extract a list of object files from the stored files, including: for each stored file, determining whether a difference between latest modified time of the stored file and the current time exceeds a predetermined time range, and adding the stored file to the list of object files if it is determined that the difference exceeds the predetermined time range;

getting a list of files to be deleted, wherein each of the files to be deleted is in the list of object files and is not in the list of protected files; and deleting each of the files included in the list of files to be deleted from the storage device of the edge node; and wherein the indexing server is configured for returning the list of protected files according to a request from the main controlling server of the edge node, wherein acquiring the list of protected files comprises:

in response to determining that the used storage space of the storage device exceeds the predetermined threshold value, sending, by the main controlling server of the edge node, a deleting warning message to a proxy server, controlling the proxy server to send a file acquiring request to the indexing system using the deleting warning message, wherein the proxy server obtains the list of protected files from the index system in response to the deleting warning message, and the protected files are excluded from the list of files to be deleted; and receiving the list of protected files returned by the proxy server.

16. The system of claim 15, further comprising a proxy server, configured for providing encrypted communication between the main controlling server and the indexing server.

17. The system of claim 15, wherein the main controlling server is further configured for:

receiving a file with a filename sent from a client;

determining a saving directory of the file, wherein the saving directory has at least three levels, including: a root directory, a first subdirectory, and a second subdirectory; and saving the file in the storage device of the edge node, wherein determining the saving directory of the file further comprises:

determining the root directory based on a number of the storage disks included in the storage device of the edge node, determining the first subdirectory based on a remainder of a first hash value of the filename divided by a first integer; and determining the second subdirectory based on a remainder of a second hash value of the filename divided by a second integer, wherein the first hash value of the file name and the second hash value of the file name are obtained based on different hash functions.

18. The system of claim 17, wherein the main controlling server is further configured for:

mounting files in the storage device of the edge node into virtual directories at the main controlling server via a network file system, wherein a virtual directory of the file with the filename is determined based on the saving directory of the file, and files stored on a same storage disk are mounted in multiple corresponding virtual subdirectories uniformly.

19. The system of claim 15, wherein the main controlling server is configured for performing the directory traversal in a serial manner for files in a same disk, and in a parallel manner for files is different disks.

20. A main controlling server in an edge node of a content delivery network, the server comprising:

memory;

one or more processors; and one or more modules stored in the memory and configured for execution by the one or more processors, the one or more modules comprising instructions:

to save files delivered from a data center of the CDN to a storage device of the edge node;

to monitor whether used storage space of the storage device of the edge node exceeds a predetermined threshold value, the storage device being a non-volatile memory;

to acquire a list of protected files from the indexing system in response to determining that the used storage space in the non-volatile memory exceeds the predetermined threshold value;

to perform directory traversal for the files stored in the storage device of the edge node to extract a list of object files from the stored files, including: for each stored file, determining whether a difference between latest modified time of the stored file and the current time exceeds a predetermined time range, and adding the stored file to the list of object files if it is determined that the difference exceeds the predetermined time range;

to get a list of files to be deleted, wherein each of the files to be deleted is in the list of object files and is not in the list of protected files; and to delete each of the files included in the list of files to be deleted from the storage device of the edge node, wherein in acquiring the list of protected files, the one or more processors are configured to:

in response to determining that the used storage space of the storage device exceeds the predetermined threshold value, send a deleting warning message to a proxy server, control the proxy server to send a file acquiring request to the indexing system using the deleting warning message, wherein the proxy server obtains the list of protected files from the index system in response to the deleting warning message, and the protected files are excluded from the list of files to be deleted; and receive the list of protected files returned by the proxy server.

* * * * *